United States Patent [19]

Lippincott

[11] Patent Number: 5,179,368
[45] Date of Patent: Jan. 12, 1993

[54] METHOD AND APPARATUS FOR INTERFACING COMPUTER LIGHT PENS

[76] Inventor: Douglas E. Lippincott, 7861 Harhay, Midway City, Calif. 92655

[21] Appl. No.: 434,072

[22] Filed: Nov. 9, 1989

[51] Int. Cl.⁵ ............................................. G09G 3/02
[52] U.S. Cl. .................................... 340/707; 340/708
[58] Field of Search .................. 340/707, 708, 712; 178/18, 19

[56] References Cited

U.S. PATENT DOCUMENTS

| | | | |
|---|---|---|---|
| 3,997,891 | 12/1974 | Iwamura et al. | 340/707 |
| 4,236,452 | 11/1980 | Masuzawa et al. | 340/707 |
| 4,367,465 | 1/1983 | Mati et al. | 340/707 |
| 4,454,417 | 6/1984 | May | 340/707 |
| 4,591,841 | 5/1986 | Gunderson et al. | 340/707 |
| 4,812,828 | 3/1989 | Nishi et al. | 340/707 |
| 4,923,401 | 5/1990 | Marshall et al. | 340/708 |

OTHER PUBLICATIONS

*User's Guide for PXL-350 Hi-Res Light Pen Board*, FTG Data Systems, 10801 Dale Street, P.O. Box 615, Stanton, Calif., Apr. 30, 1986.

*Primary Examiner*—Alvin E. Oberley
*Assistant Examiner*—Matthew Luu
*Attorney, Agent, or Firm*—Knobbe, Martens, Olson & Bear

[57] ABSTRACT

A method and apparatus to improve the accuracy and responsiveness of computer light pens, while simultaneously reducing the associated computing overhead, is disclosed. A light pen is a device that generates an electrical signal when touched to an illuminated section of a computer screen. The position of the pen on the screen can be determined by timing relationships between the signal from the pen and the synchronizing signals being sent to the screen by its controller. The interface apparatus utilizes a pair of synchronous digital counters, one for each axis, to accumulate the timing information. A special processing method is used for the data that is read from the counters to substantially reduce the false horizontal movement normally associated with light pens. The special processing eliminates the need for frame-to-frame averaging, resulting in greatly improved responsiveness. The improved interface method and apparatus utilize a combination of hardware and software interrupts to reduce computational overhead.

2 Claims, 10 Drawing Sheets

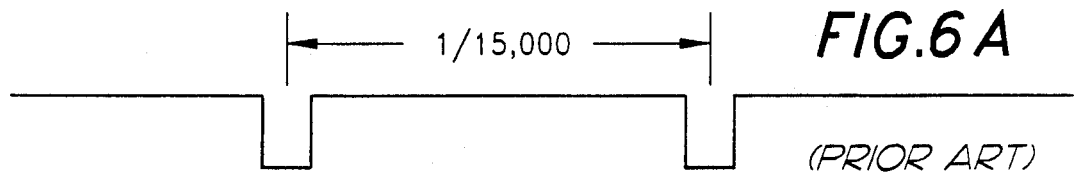
FIG. 6A
(PRIOR ART)
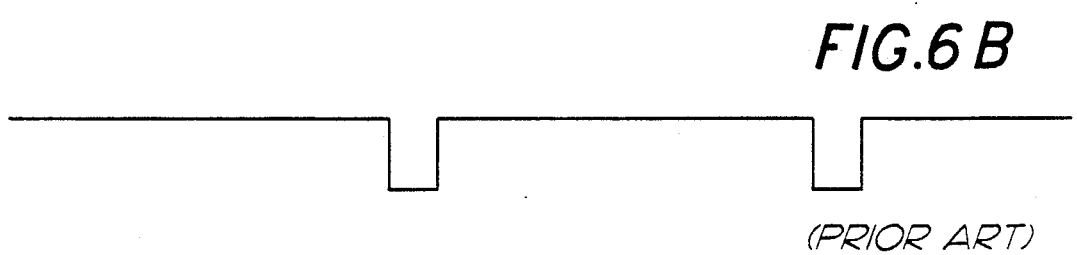
FIG. 6B
(PRIOR ART)
FIG. 6C
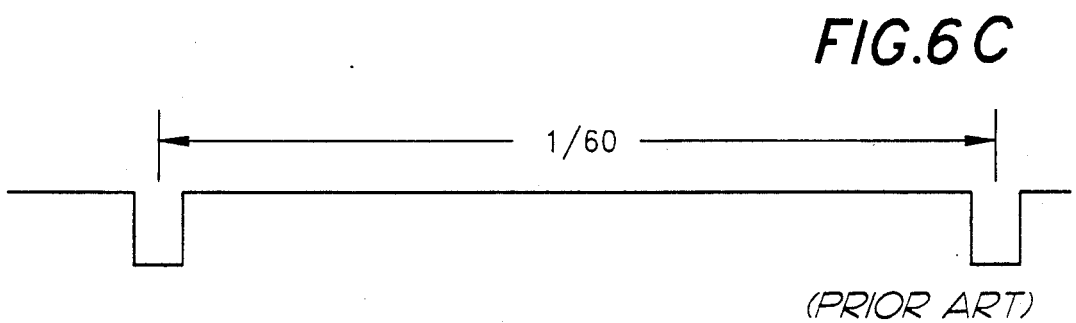
(PRIOR ART)
FIG. 6D
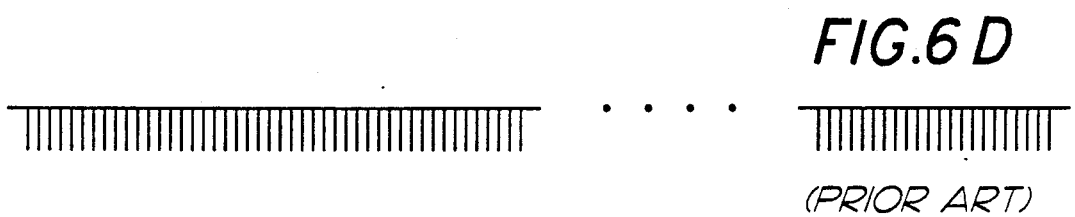
(PRIOR ART)
FIG. 6E
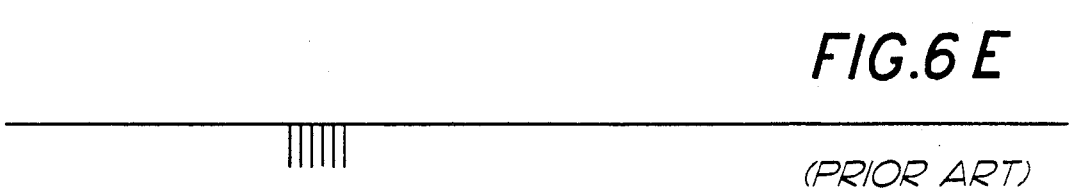
(PRIOR ART)

METHOD AND APPARATUS FOR INTERFACING COMPUTER LIGHT PENS

BACKGROUND OF THE INVENTION

1. Field of the Invention

This invention relates to light pens for computers, and more particularly to a method and apparatus for interfacing a light pen to a computer.

2. Description of the Related Art

A number of methods have been developed for allowing a user to interact with a computer. The most widely used device for computer input is a keyboard, much like that provided on a typewriter. For many applications, primarily text-based programs such as word processors, the keyboard is an effective way to input data to the computer for an experienced touch-typist, however, keyboard interface devices pose limitations for users who are unskilled typists.

Two of the many other input devices that exist for computers are the "mouse" and the light pen. A mouse is a small device that is moved by hand on a flat surface, such as a desk top. The mouse provides signals to the computer which indicate the movement of the mouse on the flat surface (e.g., a desk top). Movement of the mouse on the flat surface corresponds to changes of x- and y-axis coordinates of a cursor which is displayed on the computer monitor. A light pen, on the other hand, is placed directly onto an area of the computer monitor screen. In conjunction with a computer interface apparatus, the position of the pen on the computer monitor screen is determined as an x-y coordinate. Mouse devices and light pens are usually fitted with some type of user-actuatable switch device. This switch device may be used to transmit special signals to the computer which may, for example, indicate that a selection has been made by the user.

The present state of computer software development is such that a significant number of new programs are being based on a graphical user interface (GUI) working in conjunction with an external pointing device such as a mouse or light pen. In a GUI, a cursor (often in the shape of an arrow) is typically displayed on the screen, and the position of the cursor may be manipulated by the user with the pointing device (i.e., the mouse or light pen). With a GUI, multiple-choice menus are graphically displayed onto the screen of a computer monitor. The multiple-choice menus are generally used to show selection options available to the user. Typically, the user makes a selection from a menu by positioning the cursor over an item in that menu then actuating the pointing device's switch to indicate that he has made his choice. While it is possible to assign keys on a keyboard for cursor positioning, and to move the cursor by repeatedly pressing these keys, keyboards are very inefficient as pointing devices when compared to light pens or mouse devices. An external device optimized for x-y positioning, such as a mouse or light pen, is generally quicker and easier to use than a keyboard, particularly for unskilled typists.

Many computer users prefer light pens to mouse devices because a light pen requires significantly less desk space than a mouse. Furthermore, some tasks such as freehand drawing are far easier to accomplish with a light pen than with a mouse. This is because a light pen is used directly on the surface of the computer monitor screen, much in the same way that a pen can be used on a piece of paper. When freehand drawing with a light pen, the user places the tip of the light pen onto the computer monitor screen. The position of the light pen on the computer monitor screen is determined by the computer, and the area of the computer monitor screen proximate to the tip of the light pen is darkened (or alternately brightened from a dimly illuminated background). The smallest area of the computer monitor screen that can be individually controlled by the computer system is called a pixel. Ideally, the pixel corresponding to the exact location of the tip of the light pen on the computer monitor screen is darkened (or illuminated). In this way, those portions of the computer monitor screen which have been touched by the light pen are darkened to display the pattern "drawn" by the light pen onto the computer monitor screen. It can be seen that freehand drawing is virtually impossible with a keyboard.

Prior to the present invention, light pen systems have characteristicly incorporated significant amounts of positional jitter and inaccuracy. That is, when the light pen is placed onto the computer monitor screen, a significant margin of error exists when calculating the position of the pixel(s) on the computer monitor screen proximate to the location of the tip of the light pen. Positional jitter and inaccuracy may cause the computer to darken pixels which do not exactly correspond to the position of the light pen on the computer monitor screen. In addition, positional jitter may cause certain pixels near to the tip of the light pen to alternately darken and illuminate so that the line drawn by the light pen appears to jitter or shake. In prior devices, the jitter has been reduced by averaging the position data within the computer over short periods of time (typically less than one second), but this reduces the responsiveness of the light pen to rapid movements by the user.

Another characteristic of prior light pen systems is that a significant amount of computational overhead is required to be used to determine whether or not the light pen is even pointing at an illuminated area of the computer monitor screen.

Thus a need exists for a light pen system which compensates for positional jitter and inaccuracy. A further need exists for a light pen system which can determine if the light pen is being employed on an unilluminated portion of the computer monitor screen, without requiring a significant amount of computational time.

SUMMARY OF THE INVENTION

A method and apparatus for determining the position of a light pen on a computer screen utilizing synchronous counters and improved processing of the data from the counters.

One aspect of the present invention is a light pen interface for interconnecting a light pen and a computer system. The computer system has a raster scanning computer display monitor that is synchronized with horizontal and vertical synchronization signals. The computer system provides video data to the display monitor in synchronism with the horizontal and vertical synchronization signals at a data rate. The video data causes the illumination of selected pixels on the screen. The light pen is operable when positioned on the screen to provide a light pen output signal that indicates when a pixel proximate to the light pen is illuminated. The improved light pen interface comprises a light pen output latch that receives the light pen output signal and provides a latch output signal that is activated by the light pen output signal. The light pen output latch has a reset input signal that selectively resets the latch output signal. A first counter is included that is reset on the occurrence of each vertical synchronization signal and that provides first count outputs that count on each occurrence of each horizontal synchronization signal. A high frequency oscillator provides an oscillator output signal that typically operates at a rate at least as great as the data rate of the video data provided to the display monitor. A second counter is reset on the occurrence of each horizontal synchronization signal and provides second count outputs that count on each cycle of the high frequency oscillator output signal. A counter latch stores respective first and second values of the first and second count outputs from the first and second counters. An interrupt generation circuit provides an interrupt to the computer system on the activation of the latch output signal. A bus interface circuit is included that is responsive to address and control signals from the computer system and that provides the first and second count values to the computer system to identify a location of an illuminated pixel. The bus interface circuit further provides the light pen output latch reset signal to the light pen output latch.

In preferred embodiments of the light pen interface, a synchronization circuit is included that is driven by the high frequency oscillator output signal and that receives the light pen latch output signal. The synchronization circuit provides a synchronization output signal that controls the counter latch so that the counter latch operates at a time when the second counter has stable count outputs.

Another aspect of the present invention is a method for reducing the positional jitter that occurs when using a light pen to detect an illuminated pixel on a video display screen of a raster scanning video display monitor in a computer system. The method comprises the steps of resetting a first count value on the occurrence of an active vertical synchronization signal from the computer system; incrementing the first count value on each occurrence of an active horizontal synchronization signal subsequent to the vertical synchronization signal; resetting a second count value on each occurrence of the horizontal synchronization signal; and incrementing the second count value on each cycle of a high frequency oscillator output signal. The oscillator output signal has a frequency at least as great as the rate at which data is applied to the video display monitor by the computer system. The method includes the further steps of detecting the illumination of a pixel on the video display screen within the field of view of the light pen and providing a light-detected output signal responsive thereto; storing a first count value and a second count value on the occurrence of the light-detected output signal and generating an interrupt signal to the computer system; transferring the first and second count values to the computer system to identify the location of the illuminated pixel and saving the transferred values. The method includes the further steps of deactivating the light-detected output signal. Thereafter, the method repeats the steps of incrementing the first count value, resetting the second count value, incrementing the second count value, detecting the illumination of a pixel, storing the first and second count values, transferring and storing the first and second count values, and resetting the light-detected output signal. The method then includes the step of selecting one of the first count values and one of the second count values to represent the location of the light pen on the video display screen, the selected one of the second count values being the smallest of the stored second count values.

In preferred embodiments of the method, the selected one of the first count values is the smallest of the stored first count values. Alternatively, the selected one of the first count values is the first count value transferred with the selected one of the second count values.

Also preferably, the method further includes the step of converting the selected one of the first count value and the second count value to a coordinate location on the video display screen.

In a still further preferred embodiment of the method, the step of transferring includes the step of generating a first interrupt signal to the computer system when the light-detected signal is activated, and the step of responding to the first interrupt signal to transfer the first and second count values to the computer system. The method further includes the step of generating a second interrupt signal to the computer system on each occurrence of the vertical synchronization signal. The computer system responds to the second interrupt signal to select the selected one of the first count value and the selected one of the second count value.

In a particularly preferred embodiment, the method includes the step of determining whether the light pen is positioned on the video display screen. The step comprises the steps of detecting a first occurrence of the second interrupt signal; waiting for a second occurrence of the second interrupt signal; and setting a flag to indicate that the light pen is positioned on the video display screen if the first interrupt signal occurs between the first and second occurrences of the second interrupt signal.

BRIEF DESCRIPTION OF THE DRAWINGS

FIGS. 6A-6E illustrate the timing relationships between the vertical and horizontal sync pulses input to the display sub-system of FIG. 1, and the light detection signals output from the light pen.

DETAILED DESCRIPTION OF THE PREFERRED EMBODIMENT

Figure 1:
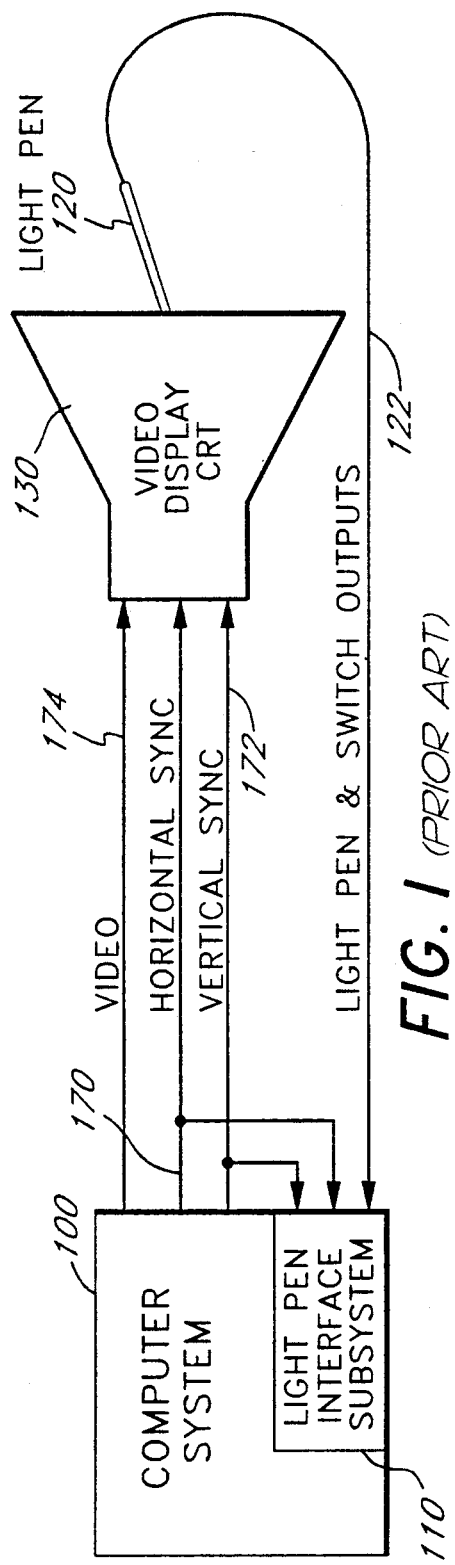
FIG. 1 is a schematic block diagram of a typical computer system along with a display subsystem, a light pen interface subsystem, and a light pen used in accordance with the present invention.
Figure 2:
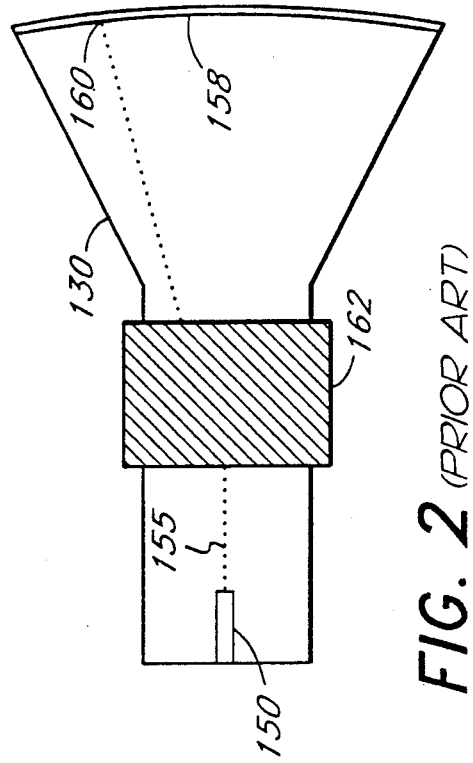
FIG. 2 is a simplified overview of a Cathode Ray Tube (CRT) as typically employed in a display subsystem.

FIG. 1 is a schematic overview of a typical computer system 100 along with a display subsystem, a light pen interface subsystem 110, and a light pen 120 which provides light pen and switch output signals on a cable 122. The display subsystem includes a cathode ray tube (CRT) 130 illustrated in FIG. 2. The CRT 130 is comprised of an electron source 150 and means to form electrons from the electron source 150 into an electron beam 155. The electron beam 155 is directed toward and focused upon a phosphorescent coating 158 which lines the inside face of the CRT 130. The intensity of the electron beam 155 can be controlled in a conventional manner by circuitry within the display subsystem (not shown). A greater intensity of the electron beam 155 will produce brighter visible light at the point of impact 160 of the electron beam 155 with the phosphorescent coating 158. Alternatively, a lower intensity of the electron beam 155 will produce dimmer visible light at the point of impact 160 of the electron beam 155, so that a very low intensity electron beam 155 will result in a dark portion at the point of impact 160. The CRT 130 further includes a deflection apparatus 162 for deflecting the electron beam 155 so as to control the impact position of the electron beam 155 with the phosphorescent coating 158 on the face of the CRT 130.

Figure 3:
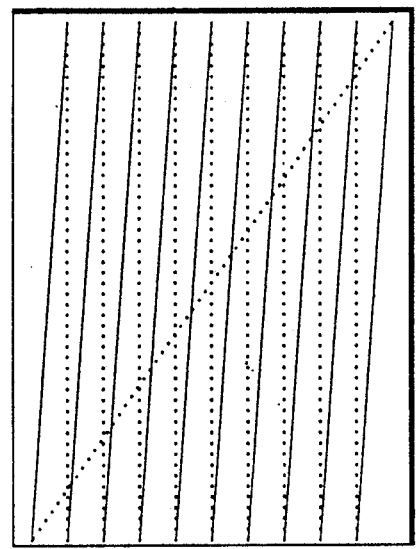
FIG. 3 illustrates the technique of raster scanning typically used in conjunction with a CRT to form visual images on the face of a computer monitor.

Images are usually formed on the face of the CRT 130 by raster scanning techniques wherein the electron beam 155 is very rapidly swept in one axis (typically side to side) and simultaneously swept at a much slower rate in the other axis (typically top to bottom). FIG. 3 illustrates a typical raster scanning application wherein the electron beam 155, initially positioned at the top left corner of the screen, is rapidly -wept horizontally to the right edge of the screen. The electron beam 155 is then almost instantaneously repositioned at the left edge of the screen again for another left to right sweep. A much slower top to bottom sweep allows the entire screen to be covered. Since the light produced by the electron beam 155 striking the phosphorescent coating 158 will fade rapidly once the electron beam moves on to a different position, the screen must be repeatedly re-scanned for images to remain visible. Typical computer display subsystems scan each horizontal line in approximately 1/15,000 to 1/64,000 of a second, while the top to bottom scan of an entire screen typically occurs in 1/60 of a second.

Figure 4:
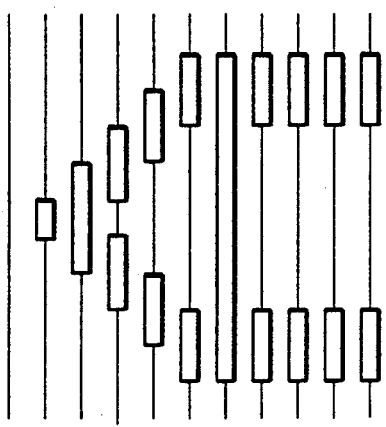
FIG. 4 illustrates how a typical character is formed using raster scanning techniques.

In order to form images on the CRT 130 while it is being raster scanned, the electron beam 155 is controlled or gated in such a way as to be consistently on or off at the same point on the phosphorous coating 158 in successive scans. Because the illumination of the phosphorous coating 158 fades very quickly it is necessary to re-illuminate the same pixel in successive scans (i.e., every 1/60 second) in order for the illuminated pixel to remain visible. FIG. 4 shows the beam gating pattern that would be used to form the character, "A". In each line a certain number of pixels are illuminated by the electron beam 155. The illuminated portions of each line in FIG. 4 are represented by the thicker bold portions of each horizontal line. While the electron beam 155 is scanning across each line, the intensity of the electron beam 155 is increased in those portions of the lines which are to be illuminated (i.e., the thicker bold portions of the lines depicted in FIG. 4).

For consistency and stability, the computer, system 100 generally incorporates piezoelectric crystal oscillator circuitry (not shown). The piezoelectric crystal oscillator circuitry determines the maximum rate at which signals controlling the intensity changes of the electron beam 155 will be sent to the display subsystem. The piezoelectric crystal oscillator is usually referred to as the "pixel clock" or "dot clock", because the rate at which pixels or dot are placed on the computer monitor screen is determined by the frequency of the piezoelectric crystal oscillator.

Referring again to FIG. 1, three conventional signals are sent from the computer system 100 to the display subsystem. The three signals sent to the display subsystem are the horizontal synchronizing signal on a line 170, the vertical synchronizing signal on a line 172, and the video signal on a line 174 which determine the intensity of the electron beam 155. The display subsystem begins a horizontal sweep from left to right, and continues until the horizontal synchronizing signal is received to trigger near-instantaneous horizontal repositioning and another horizontal (x-axis) sweep. Similarly, the display subsystem will begin a vertical sweep and continue until the vertical synchronizing signal is received to trigger near-instantaneous vertical repositioning and another vertical (y-axis) sweep. The video signal is used to control the beam current while the raster scan is in progress in order to form images on the screen of the CRT 130.

Figure 5:
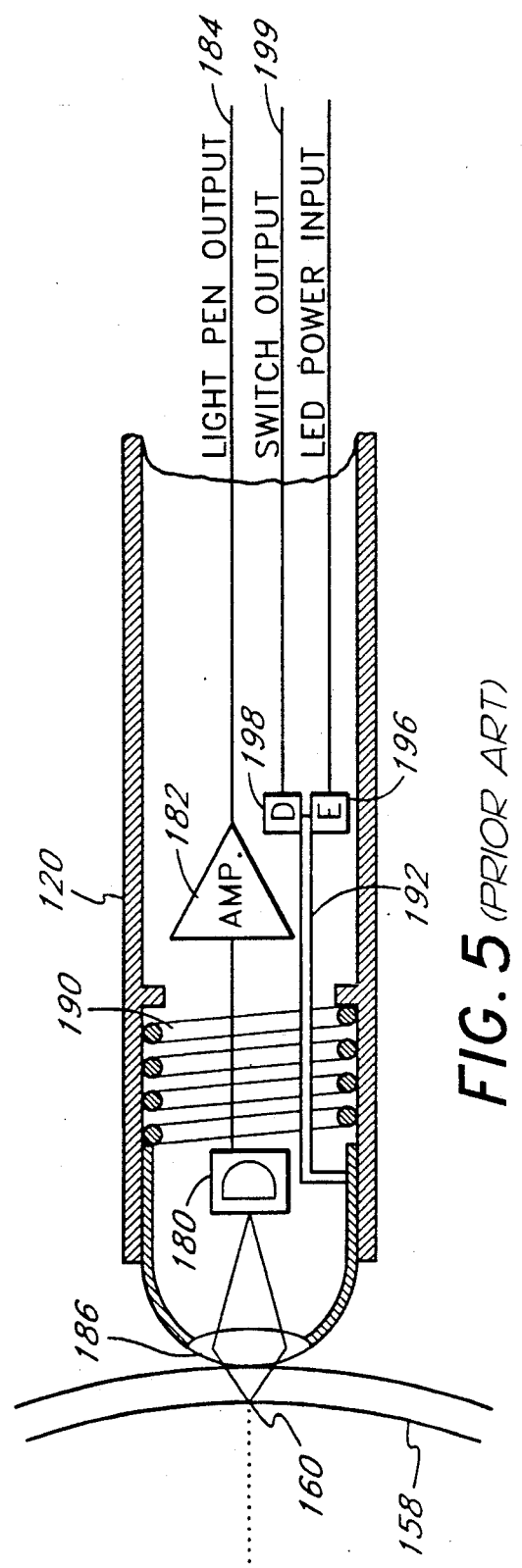
FIG. 5 is a schematic diagram which details the structure of a typical light pen such as may be employed in the present invention.

FIG. 5 is a typical schematic view of the light pen 120. The light pen 120 includes a photodetector 180 and an amplifier/comparator 182. Light from the face of the CRT 130, produced in response to the electron beam 155 striking the phosphor coating 158 at the point 160, is focused onto the photodetector 180 through an optical system 186. The optical system 186 is designed to limit the field of view of the light pen 120 to a relatively small area on the face of the CRT 130. The amplitude of the signal produced by the photodetector 180 is proportional to the intensity of the light focused onto the photodetector 180. The signal produced by the photodetector 180 is amplified by the amplifier/comparator 182, and transmitted to the light pen interface subsystem 110 via a line 184 in the light pen output cable 122. Thus, the light pen 120 will produce an electrical pulse on the line 122 whenever the area being viewed by the light pen 120 is illuminated by the electron beam 155. Note, that the threshold level of the amplifier/comparator 182 is set so that a pulse will only be transmitted to the light pen interface subsystem 110 when the electron beam 155 scans across the field of view of the light pen 120. Advantageously, the persistence of the phosphorous coating 158 is such that the intensity of the light produced, as the electron beam 155 scans across each pixel within the field of view of the light pen 120, decreases below the threshold level before the electron beam 155 re-enters the field of view of the light pen 120 in the next horizontal scan.

The light pen 120 also includes a user actuated switch. The switch comprises a spring 190, a blocking arm 192, a photoemitter 196, and a photodetector 198. When the face of the light pen 120 is pressed against the computer monitor screen of the CRT 130, the spring 190 compresses, positioning the blocking arm 192 between the photoemitter 196, and the photodetector 198. The output of the photodetector 198 on a line 199 then transitions to a "low" state indicating that the switch has been actuated. It will be understood by one skilled in the art that the power supplies and circuitry (not shown) associated with the amplifier/comparator 182, and the photodetectors 180, 198 are implemented in a conventional manner.

FIGS. 6A–6E graphically illustrate the timing relationship of the display subsystem's synchronizing signals, and the pulses transmitted by the light pen 120 as a function of time. FIGS. 6A and 6B show the timing relationship between the horizontal sync pulse and the pulses transmitted by the light pen 120 when the electron beam 155 scans across the field of view of the light pen 120. FIG. 6A depicts the horizontal sync pulse signal, while FIG. 6B depicts the output of the light pen 120. Note that pulses are transmitted by the light pen 120 in successive horizontal scans because the field of view of the light pen 120 typically includes more than one horizontal scan line. FIGS. 6C–6E illustrate the overall timing relationships between the vertical sync pulse, the horizontal sync pulses, and the pulses emitted by the light pen 120. FIG. 6C illustrates the vertical sync pulse, while FIG. 6D illustrates the horizontal sync pulse and FIG. 6E illustrates the pulse emitted by the light pen 120. The total number of horizontal scan lines included within the field of view of the light pen 120 is on the order of 6 lines, so that for each vertical sync pulse (i.e., each screen) there will be about 6 pulses transmitted from the light pen 120 to the light pen interface subsystem 110, one between each of 7 successive horizontal pulses. No light pen signal would be present for scan lines that were outside of the field of view of the light pen.

The timing relationship between the pulses produced by the light pen 120 and the vertical sync pulses determine the vertical position of the light pen on the screen of the CRT 130. For example, in FIG. 6E, if the pulses emitted by the light pen 120 occurred slightly more to the left, this would indicate that the light pen 120 was located slightly higher on the screen of the CRT 130. The timing relationship between the pulse from the light pen 120 and the horizontal synchronizing pulse is proportional to the horizontal position of the light pen 120 on the face of the CRT 130. For example, if the pulses depicted in FIG. 6B were shifted slightly to the left, this would indicate that the light pen 120 is positioned slightly more to the left on the face of the CRT 130.

Figure 7:
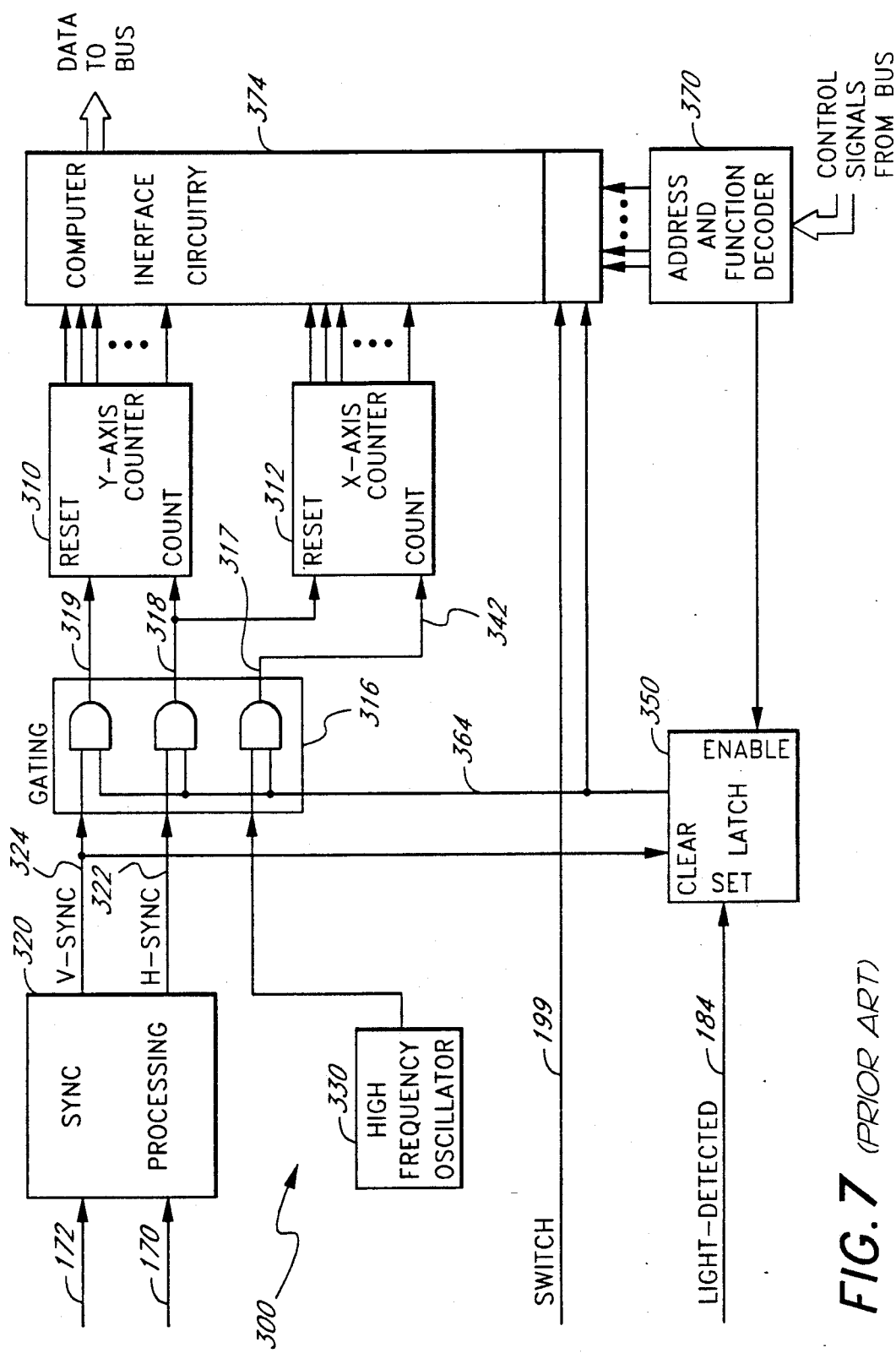
FIG. 7 is a simplified block diagram of a typical prior art light pen interface apparatus.

The position of the light pen 120 on the screen of the CRT 130 may be determined as a function of the timing relationships between the signals produced by the light pen 120, and the horizontal and vertical synchronizing signals from the display subsystem. FIG. 7 is a schematic block diagram of a prior art light pen interface unit 300 used to measure the timing relationships between the signals produced by the light pen 120, and the horizontal and vertical synchronizing signals from the display subsystem. The prior art light pen interface unit 300 is intended to operate as a subsystem within the computer system 100. As an overview, the prior art light pen interface unit 300 utilizes a pair of counters 310, 312 controlled by stable signals from a gating circuit 316 for measuring timing relationships, namely a X-axis counting signal on a line 317, a y-axis counting/x-axis reset signal on a line 318, and an x-axis counting signal on a line 319. Circuitry is provided to suspend counting upon receipt of a signal from the light pen. A detailed description of the operation of the prior art light pen interface unit 300 follows.

As illustrated in FIG. 1, the light pen interface subsystem 110 receives the same horizontal and vertical synchronizing signals as are sent to the display subsystem by the computer system 100. If the light pen interface subsystem 110 is implemented using the prior art light pen interface unit 300, these synchronizing signals are conditioned by a sync processing circuit 320 (FIG. 7) that provides a processed horizontal sync signal on a line 322 and a processed vertical sync signal on a line 324 for compatibility with the remaining interface subsystem circuitry. Processing of the synchronizing signals may include filtering for noise removal, buffering, polarity inversion, and trailing-edge detection, however, details of the signal processing are accomplished in a conventional manner and are not pertinent to the present invention.

The horizontal position of the electron beam 155 is measured by counting a constant high frequency signal provided by an oscillator 330 which is provided as the x-axis count input to the x-axis counter 312 via the gating circuit 316 and the line 317. As the electron beam 155 scans horizontally across the screen of the CRT 130, the high frequency clock increments the count value of the x-axis counter 312. Since the horizontal scanning rate of the electron beam 155 is constant, the count registered on the x-axis counter 312 varies proportionally with the horizontal position of the electron beam 155 on the face of the CRT 130. In general, the frequency of the clock 330 will be at least the same as that used by the computer system 100 to set the maximum rate at which intensity changes in the electron beam 155 will be sent to the display subsystem (i.e., the "pixel clock" frequency). Use of a lower frequency than the pixel clock frequency may result in jitter and positioning errors. 14 MHz to 50 MHz is a typical frequency range for the high frequency oscillator 330.

The vertical position of the electron beam 155 on the screen of the CRT 130 is measured by counting the number of horizontal sync signal pulses since the most recent vertical sync pulse. Each horizontal sync pulse signifies that the electron beam has moved down to the next horizontal scan line. As the electron beam 155 scans from top to bottom, the horizontal sync signal increments the count of the y-axis counter 310. Since the electron beam 155 scans vertically at a constant rate, the count registered on the y-axis counter 310 varies proportionally with the vertical position of the electron beam 155 on the screen of the CRT 130. The frequency of the horizontal synchronization signal is significantly lower than the frequency of the high frequency oscillator 330.

Note that when the electron beam 155 moves almost instantaneously to the left side of the computer monitor screen at each horizontal sync pulse, the x-coordinate of the electron beam 155 returns to zero. Thus at each horizontal sync pulse, the x-axis counter 312 must be reset to zero by means of a clear signal along a line 340. Similarly, it can be seen that as the electron beam 155 hits the bottom right hand corner of the computer monitor screen and is swept back to the top left corner of the computer monitor screen nearly instantaneously, the y-coordinate returns to zero, so that the y-axis counter 310 must be reset to zero at each vertical sync pulse. The y-axis counter is reset to zero by means of a clear signal along a line 319 that is driven by the processed vertical synchronizing signal via the gating circuit 316.

During normal operation of the prior art light pen interface unit 300, processed synchronizing signals and the output of the high frequency clock 330 are transmitted to the gating circuitry 316. Based on the state of a latch 350, the processed synchronizing and high frequency clock signals may then passed to the x- and y-axis counters 310, 312.

The x-axis counter 312 must have a sufficient range to be able to provide a unique count value for each of the clock signal pulses of the high frequency oscillator 330 that can occur between horizontal sync pulses. Advantageously, the number of clock signal pulses of the high frequency oscillator 330 between horizontal sync pulses is on the order of $2^{10}$. Thus, a 10-bit to 12-bit counter is typically used to implement the x-axis counter 312.

The y-axis counter 310 must have a sufficient range to be able to provide a unique count value for each horizontal sync pulse that can occur between vertical sync pulses. The number of horizontal sync pulses occurring between vertical sync pulses is also on the order of $2^{10}$. Therefore, a 10-bit to 12-bit counter is typical used to implement the y-axis counter 310.

When light is detected at the light pen 120, a signal is transmitted along the line 184 to the latch 350. The signal transmitted by the light pen 120 sets the output of the latch 350 low. The low output of the latch 350 is transmitted to the gating circuitry 316 along a line 364, disabling the AND gates within the gating circuitry 316, so that the horizontal and vertical sync signals, and the output of the high frequency oscillator 330 are no longer transmitted to the x- and y-axis counters 312, 310. Thus, the values stored within the x-axis counter 312 and the y-axis counter 310 at the time light is detected by the light pen 120, correspond to the x- and y-coordinates of the light pen 120 on the face of the CRT 130. Once the latch 350 is set to a state that inhibits the horizontal and vertical sync signals, and the high frequency oscillator signal from reaching the counters 310, 312, the latch 350 will remain in that state until a command signal is received from the control sub-program to reset the latch 350 to a state that permits counting.

The latch 350 is reset in two steps. First, a command signal from the control sub-program is decoded by an address and function decoder 370. This signal enables the reset circuitry within the latch 350. Second, the latch is actually cleared when the next vertical synchronizing signal is sent from the computer 100 to the light pen interface subsystem 110, thus permitting counting to resume. Note that the enable signal from the address and function decoder 370 enables the clear signal processing of the vertical sync pulse, so that the latch 350 will be cleared only on the first vertical sync pulse which occurs subsequent to an enable signal from the address and function decoder 370. This two-step reset is required to resynchronize the y-axis counter 310 with the display subsystem.

Significant time exists between the time that the clock signal is disabled (i.e., no longer applied to the counters 310, 312 in response to the light detection signal from the light pen 120), and the time that the output of the counters 310, 312 must be stable (i.e., the time when the counters 310, 312 are read in response to a control signal from a control sub-program within the software). Because the allowed stabilizing time is relatively large, counters which generally require a long time to stabilize, such as ripple counters, are usually employed in prior art devices. In a ripple counter, the clock input is applied only to the least significant stage, and this pulse propagates, or "ripples," up through each stage to the most significant stage in the form of a "carry" bit. Because the "carry" bit must propagate through each counter stage, ripple counters characteristically require substantial amounts of stabilization time for count state transitions. Furthermore, the stabilization time for ripple counters increases with the number of counter stages. The output of a ripple counter's most significant stage may not be stable until multiple clock cycles have elapsed after input to the least significant stage has stopped. The number of stages of a ripple counter generally corresponds to the number of counter bits, so that a 10-bit ripple counter incorporates 10 stages.

The address and function decoder 370 receives commands generated by the control sub-program within the computer system 100, and decodes these commands to provide several control functions within the prior art light pen interface unit 300. Specifically, commands are decoded for the computer interface circuitry 374 which allow the values of the x-axis and y-axis counters 312, 310 to be passed to the control sub-program within the computer system 100. Furthermore, the state of various signals within the prior art light pen interface unit 300, including the state of the output of the latch 350, and the state of the switch signal from the light pen 120 along the line 199, may be read by the control sub-program through the computer interface circuitry 374.

Figure 8:
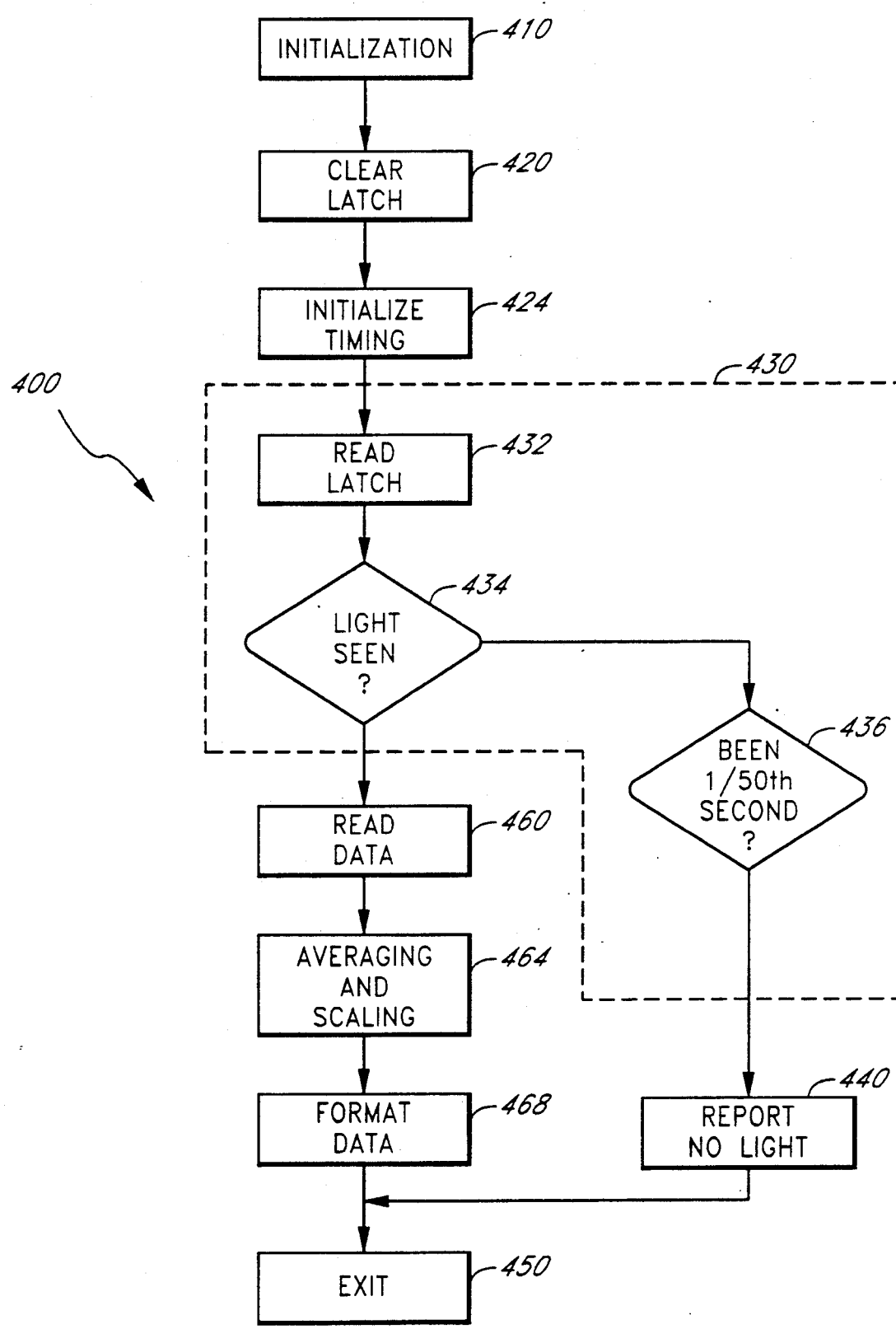
FIG. 8 is a flowchart which illustrates the details of a typical prior art software control sub-program used to process the prior art light pen interface apparatus data.

FIG. 8 is a flowchart which illustrates the method of a typical prior art software control sub-program 400 used to control the prior art interface unit 300, and to process the data from the prior art light pen interface unit 300. The control sub-program 400 would be used as a sub-process by another calling program, and would be accessed with a subroutine call or software interrupt. The overall function of the control sub-program 400 illustrated in FIG. 8, is to obtain and process information concerning the position of the light pen 120, and information relating to the state of the user actuated switch, from the prior art light pen interface unit 300. The information obtained and processed from the prior art light pen interface unit 300 is then returned to the calling program in an appropriate format.

The method employed by the prior art control sub-program 400 initially enters a process block 410. Within the process block 410 sub-program entry "housekeeping" functions, such as saving of the values within processor registers, and any functions that may be required in preparation for processing of data, are performed.

When the method enters the control sub-program 400 (i.e., in response to a subroutine call or a software interrupt request), the initial state of the latch 350 and the counters 310, 312 (FIG. 7) is indeterminate. The latch 350 may be set, indicating that the light pen 120 has detected light, but it is impossible to know if the state of the latch 350 has any current validity since the latch 350 is not cleared at each vertical sync pulse. Thus, the light pen 120 might have been pointed at the screen hours earlier and then laid on a table without the latch 350 and counters 310, 312 having been cleared. Therefore, in each response to a subroutine call or a software interrupt request, the latch 350 is cleared within a process block 420 in order to force the latch 350 into a known state and to resynchronize the counters 310, 312 at the next vertical synchronizing pulse.

The method next enters into a process block 424, wherein a timer is initialized. The timer initialized in the process block 424 is used to determine if the light pen 120 is currently being pointed to the face of the CRT 130. The method then continues into a loop 430 comprising an activity block 432, wherein the state of the latch 350 is read, and decision blocks 434, 436. The loop 430 reads and tests the status of latch 350 until either the light pen 120 detects light within the decision block 434, or a determination is made within the decision block 436 that the timer initialized in the process block 424 indicates that 1/50 second has elapsed. A time of 1/50 second assures that at least one vertical sync pulse has occurred so that a determination of whether or not the light pen 120 is pointing at the computer monitor screen can be made.

Should light not be detected in the decision block 434 within the allowed 1/50 second, as determined in the decision block 436, the method enters a process block 440. Within the process block 440, the data to be returned to the calling program is formatted to indicate that light has not been detected. The method then enters a process block 450 wherein the method exits the control sub-program 400 and control is returned to the calling program.

If light is detected, as determined in decision block 434, the method enters into a process block 460 wherein the values stored within the x- and y-axis counters 312, 310 are read and formatted for further processing. The value within the x-axis counter, for reasons to be explained below in conjunction with FIGS. 9A-B, and 10A-B, incorporates a high level of horizontal jitter. For this reason, the method enters into a process block 464 wherein a multiple-frame averaging is performed to reduce jitter. (A frame is defined as the time between vertical synchronizing pulses.) Appropriate scaling and translation are also performed within the process block 464. The scaling and translation of the values stored within x- and y-axis counters 312, 310 are performed so that each pair of counter values will correspond to the coordinate of a pixel on the computer monitor screen. Finally, the method enters into a process block 468, wherein the scaled and translated light pen position data is placed in the format expected by the calling program. The method then enters the process block 450 wherein the method exits the control sub-program 400 and control is returned to the calling program.

An examination of the method employed in accordance with the prior art control sub-program 400 will reveal a significant deficiency. That is, the 1/50 second timing loop results in significant computational overhead, particularly when used in conjunction with multi-tasking application software. Each time that the application software calls upon the prior art control sub-program 400, significant amounts of processor time are wasted while waiting for a light detection signal from the light pen 120. For example, if the pen is not pointing at the screen, and the calling program makes calls to the control sub-program 400 twenty times per second, then 20×1/50, or 0.4 seconds of each second will be spent waiting for a light detection signal from the light pen 120. Thus, in this example, 40% of the processing time for the computer system 100 is wasted.

Figure 9A:
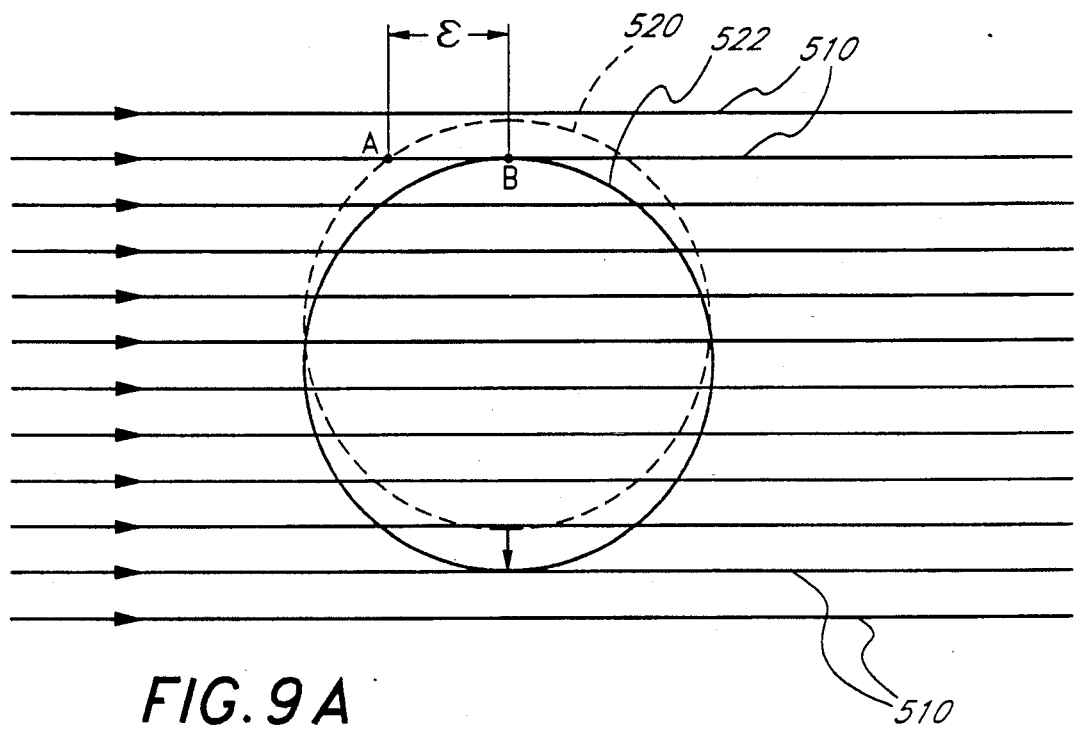
FIGS. 9A illustrates a typical multi-line field of view of the light pen, highlighting the false horizontal movement resulting from small vertical movements.

As noted above, the value stored within the x-axis counter 312 is subject to a high degree of inaccuracy due to an effect known as horizontal jitter. FIGS. 9A and 10A illustrate the problem of horizontal jitter which is characteristic of the prior art.

Horizontal jitter is produced compositely as a result of two effects. The first effect which contributes to the horizontal jitter of the value stored within the x-axis counter 312 is illustrated in FIG. 9A. FIG. 9A illustrates how false horizontal movement may be indicated as the light pen 120 is moved vertically by a very small amount. An enlargement of the screen of the CRT 130 with eleven scan lines is shown. Two circles 520, 522 representing the field of view of the light pen 120 are superimposed onto the eleven scan lines. Assume for the moment that the light pen 120 is being held against the computer monitor screen at a constant position and that the position of the electron beam 155 is somewhere above the diagrammed field of view for the light pen 120. As the scan progresses, the beam position will move repeatedly from left to right and progressively downward on the screen, eventually entering the field of view of the light pen 120. Assume further that the light pen 120 is in the first position corresponding to the field of view indicated with the dashed circle 520. The light pen 120 will detect the visible light generated by the electron beam 155 entering the field of view at a point A, sending a signal to the light pen interface subsystem 110, thereby causing the counters 310, 312 to be stopped at a value that corresponds to the position of point A. Now, let the light pen 120 be moved directly downward on the screen by a small distance (i.e., less than one scan line). The field of view of this second position corresponds to the circle 522 indicated with a solid line. As the electron beam 155 enters the field of view corresponding to the second position, light is detected at a point B. The photodetector 180 then transmits a signal which causes the counters 310, 312 to be stopped at a value that corresponds to the position of point B. As can be seen, the values stored within the counters 310, 312 in the prior art light pen interface unit 300 will indicate the same vertical position, with a horizontal position differing by a distance ε, for the first and second positions of the light pen 120, even though the light pen 120 moved only in the vertical direction.

The second effect which contributes to horizontal jitter is illustrated in FIG. 10A. FIG. 10A depicts the field of view of the light pen 120 in relation to the voltage level output by the photodetector 180 from both a plan perspective viewpoint (upper portion of FIG. 10A) and from an elevational perspective viewpoint (lower portion of FIG. 10A). The primary field of view of the light pen 120 is depicted as a solid circle 530 within a dashed circle 532. Light produced as the electron beam 155 scans inside the boundaries of the solid circle 530 will always produce a voltage output from the photodetector 180 which is above the threshold level of the amplifier/comparator 182, thereby transmitting a light detection signal to the light pen interface subsystem 110. Light produced as the electron beam 155 scans outside of the boundaries of the dashed circle 532 will produce a voltage output from the photodetector 180 which is always below the threshold voltage of the amplifier/comparator 182, thereby transmitting no light detection signal to the light pen interface subsystem 110. Light produced as the electron beam 155 scans within the boundaries of the dashed circle 532, but outside the boundaries of the solid circle 530, is within a fringe field of view. The illumination of pixels within the fringe field of view will generate light that reaches the photodetector 180; however, the light will be of lower intensity and the photodetector 180 will produce an indeterminate output voltage that may or may not cause the amplifier/comparator 182 to transmit a light detection signal to the light pen interface subsystem 110. This is illustrated more clearly by the elevational view in FIG. 10A wherein a curve 540 represents the output voltage from the photodetector 180 responsive to horizontal displacement of the electron beam within the fringe field. As illustrated, the output voltage increases gradually to a maximum value which is slightly greater than a threshold voltage $V_{TH}$ of the amplifier/comparator 182. Thus, a light detection signal can be transmitted from the amplifier/comparator 182 at any point within the indeterminate boundaries of the field of view of the light pen 120. Since the electron beam 155 scans from top to bottom, and the prior art control sub-program 400 accepts the coordinate of the light pen 120 to be at the coordinate corresponding to the point where light is first detected, a large margin of error is introduced due to the indeterminate threshold boundaries of the field of view of the light pen 120. For example, if the light pen 120 is situated so that a raster scan line falls within the indeterminate boundaries of the field of view, as shown in FIG. 10A, a light detection signal may (or may not) be transmitted at any point within the indeterminate boundary. Thus, there exists a horizontal margin of error, $\delta$, as shown in FIG. 10A, over which a light detection signal may be transmitted.

The two effects illustrated in FIGS. 9A and 10A may combine to produce a substantial, visible horizontal jitter (typically on the order of 1/10 inch) which is highly undesirable. The apparatus and method of the present invention greatly reduces the margin of error resultant from the two major effects which contribute to horizontal jitter. By defining the horizontal coordinate corresponding to the left-most point of the field of view of the light pen 120 as the horizontal position of the light pen 120, the present invention greatly reduces the effects of horizontal jitter.

Figure 9B:
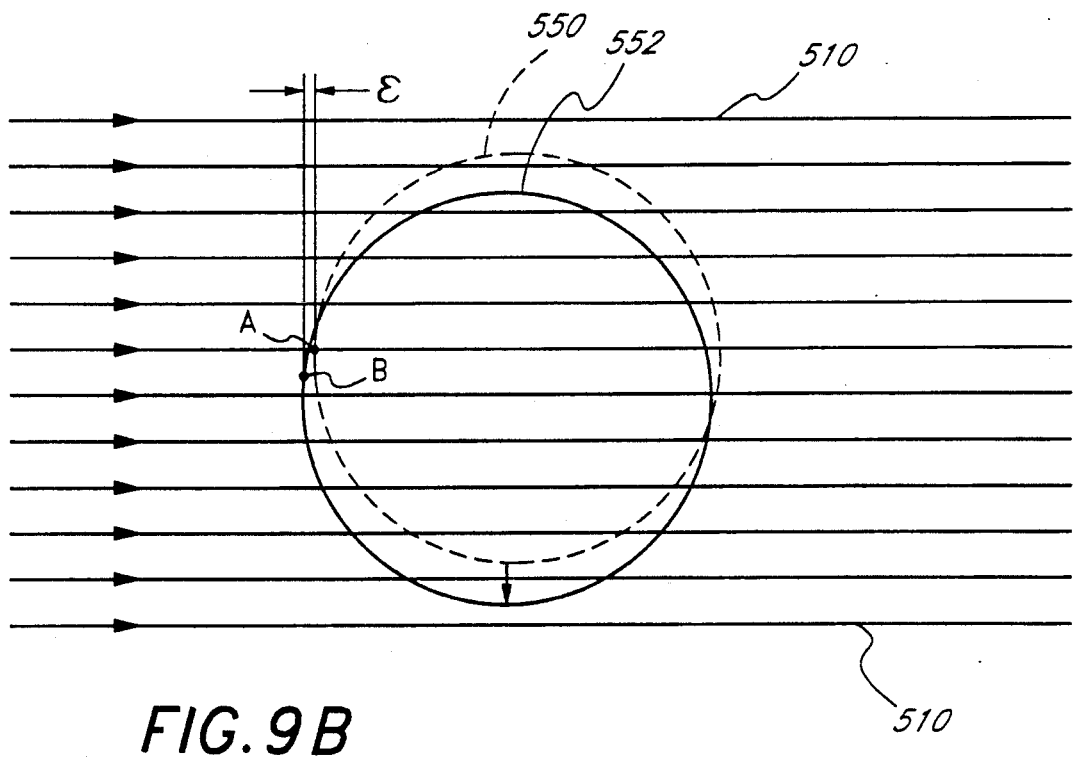
FIG. 9B illustrates a typical multi-line field of view of the light pen, highlighting the edge-of-view detection method employed in accordance with the present invention.
Figure 10B:
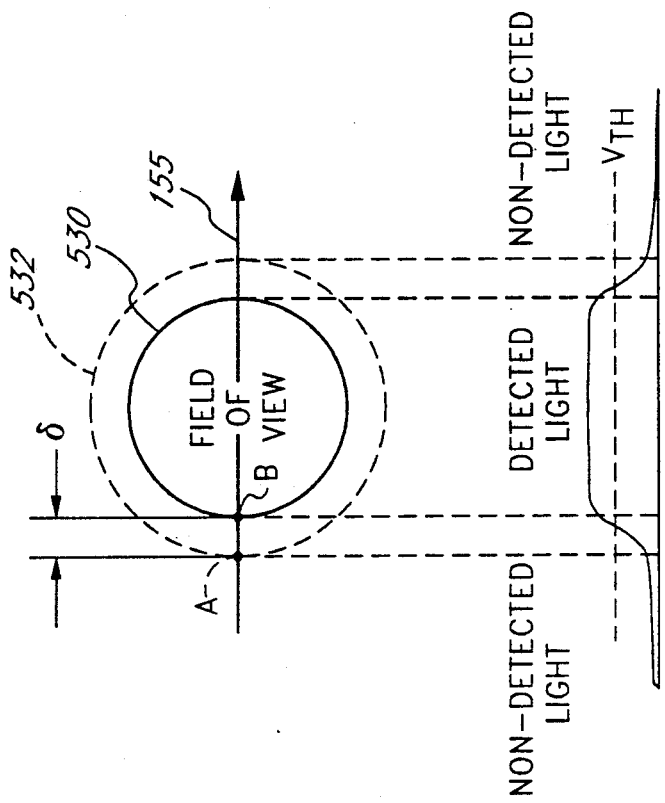
FIG. 10B illustrates the reduction of error attained when employing the edge-of-detection method in accordance with the present invention.
Figure 10A:
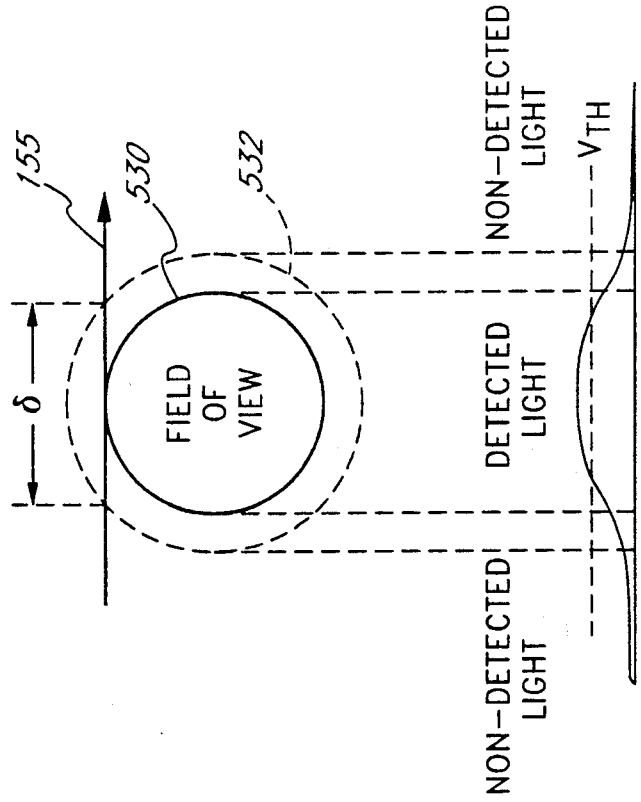
FIG. 10A illustrates error caused by the indeterminate regions within the field of view of the light pen.

FIGS. 9B and 10B illustrate the advantages of defining the horizontal position of the light pen 120 to be at the coordinate corresponding to the left-most point of the field of view of the light pen 120.

FIG. 9B illustrates how the error in horizontal position produced by slight vertical motion of the light pen 120 is significantly reduced if the horizontal position of the light pen 120 is defined to be at the left-most point of the field of view. As in FIG. 9A, the eleven horizontal lines 510 depicted in FIG. 9B represent the raster scan lines traced by the electron beam 155 on the face of the CRT 130. Also as in FIG. 9A, the field of view of the light pen 120 in the first position is indicated by a dashed circle 550, while the field of view of the light pen 120 in the second position is indicated by a solid circle 552. As the electron beam 155 scans from left to right, and from top to bottom, the electron beam 155 enters the field of view of the light pen 120 corresponding to the first position of the light pen 120. As the electron beam 155 continues to scan downward through the field of view corresponding to the first position of the light pen 120, the electron beam 155 intersects the first position field of view at points farther and farther to the left, until the left-most point of the first position field of view, point A in FIG. 9B, is reached. The horizontal coordinate of the left-most point detected in the first position field of view is then stored. Assume that, following the detection and storage of the horizontal coordinate of the left-most point in the first position field of view, the light pen 120 is moved vertically downward by a small amount (i.e., less than one scan line). When the detection of the left-most point within the second position field of view occurs, the horizontal coordinate corresponding to that left-most point, point B in FIG. 9B, is stored. Note that the horizontal distance, $\epsilon$, between point A and point B in FIG. 9B is small compared to the horizontal distance between point A and point B in FIG. 9A. Thus, the component of horizontal jitter produced by small vertical motions of the light pen 120 is greatly reduced in the present invention.

FIG. 10B illustrates how defining the horizontal position of the light pen 120 to correspond to the horizontal coordinate of the left-most point of the field of view of the light pen 120 reduces the horizontal jitter associated with an indeterminate field of view boundary. As in FIG. 10A, the circles 530, 532 depicted in FIG. 10B represent the boundaries of the primary field of view and the fringe field of view, respectively, of the light pen 120. A curve 560 in the lower portion of FIG. 10B represents the output voltage from the photodetector 180. If the horizontal coordinate of the left-most point of the field of view of the light pen 120 is defined as the horizontal position of the light pen 120, then there is an indeterminate region between point A and point B in FIG. 10B. As the electron beam 155 scans horizontally across the field of view of the light pen 120, along the raster scan line shown in FIG. 10B, a light detection signal may be transmitted at any point between points A and B. Therefore there is a horizontal margin of error, $\delta$, associated with the detection of the light produced by the electron beam 155. Note, however, that the horizontal margin of error, $\delta$, depicted in FIG. 10B is much smaller than the horizontal margin of error depicted in FIG. 10A because the electron beam passes rapidly through the fringe field of view into the primary field of view and spends relatively little time in the indeterminate region. Thus, the present invention reduces the component of horizontal jitter caused by passage of the electron beam through the indeterminate region within the field of view of the light pen 120 and a well-defined horizontal position value is provided.

The new definition of the horizontal position of the light pen 120 requires modifications in the hardware and software employed in prior art light pen systems. These modifications are incorporated into the apparatus and method of the present invention.

In the present invention, the signal from the light pen 120 which corresponds to the first scan line per frame to come into the field of view of the light pen 120 is used to determine the vertical position, but not the horizontal position of the light pen 120. The light pen signal that corresponds to the scan line that provides the left-most light pen position indication is used to determine the horizontal position of the light pen 120. The position of the light pen 120, as reported to the calling program by a control sub-program 480 (discussed below in accordance with FIG. 12B), will be a function of the first detected scan line for vertical position and left-most detected scan line for horizontal position.

Rather than storing the horizontal coordinate of the point where light is first detected as in the prior art, the present invention instead retrieves and compares the horizontal coordinates at each point which the electron beam 155 enters the field of view of the light pen 120. Practically, this means that the apparatus of the present invention must clear the latch 350 after each horizontal sync pulse while the electron beam 155 scans through the field of view of the light pen 120, so that a new horizontal coordinate may be obtained in each horizontal scan. When the light produced by the electron beam 155 is detected, the horizontal component of the detected position of the electron beam 155 is retrieved and compared with the lowest (and thereby the left-most) previous detected horizontal coordinate retrieved since the last vertical sync pulse. If the present horizontal coordinate is lower than the previous left-most coordinate, then the previous left-most coordinate is replaced with the present horizontal coordinate, otherwise the present horizontal coordinate is discarded. In this way, the left-most horizontal position in the field of view of the light pen 120 is determined.

The effective size of the field of view of the light pen 120 varies with the intensity of the image on the face of the CRT 130, as well as with design factors within the light pen 120, and it is possible that the effective field of view may be reduced to a single scan line at low screen intensities. The method of the present invention will still provide a valid indication of the position of the light pen 120 when the point of intersection of the first scan line with the field of view of the light pen 120 is identical with the left-most point of intersection of a scan line with the field of view of the light pen 120.

It should be obvious to anyone skilled in the art that the vertical position could also be easily determined by using the last scan line in the field of view, rather than the first scan line.

Furthermore, the vertical position could be determined by using a function that incorporated an averaging algorithm for the position of both the first and last scan lines in the field of view of the light pen 120, or of all scan lines in the field of view of the light pen 120. An important distinction between this vertical position averaging and the averaging performed in the prior art approach is that this vertical position averaging is performed on multiple lines within a single frame, whereas the prior art utilized averaging over multiple frames. Multi-frame averaging results in a reduction in the responsiveness of the system. Reduction in responsiveness due to multi-frame averaging is negligible in the present invention.

An advantage of averaging multiple scan lines is that the indicated vertical position of the light pen 120 would not change with screen intensity or other factors that might effect the size of the field of view. Expressed differently, the indicated vertical position of the light pen 120 would not be a function of the diameter of the field of view or of the intensity, although the point of intersection of the left-most scan line with the field of view would shift horizontally with changes in size of the effective field of view. An obvious extension to the invention would be to count the number of scan lines within the field of view and use that count to determine the size of the effective field of view. After using the left-most indication of the field of view to determine horizontal position of the left edge of the field of view, half of the effective diameter of the field of view, as determined by the number of scan lines in the field of view, could be used as an offset in order to get a more accurate indication of the center of the field of view.

The center offset indication of the field of view of the light pen 120 would not be a function of intensity of the electron beam 155 or other factors that might effect the effective size of the field of view of the light pen 120.

If an offset was added to left-most light pen position to provide a center-point indication, it would be necessary to decrease the offset at the edges of the computer monitor screen in order to be able to reach the edges of the screen with the light pen 120.

Figure 11:
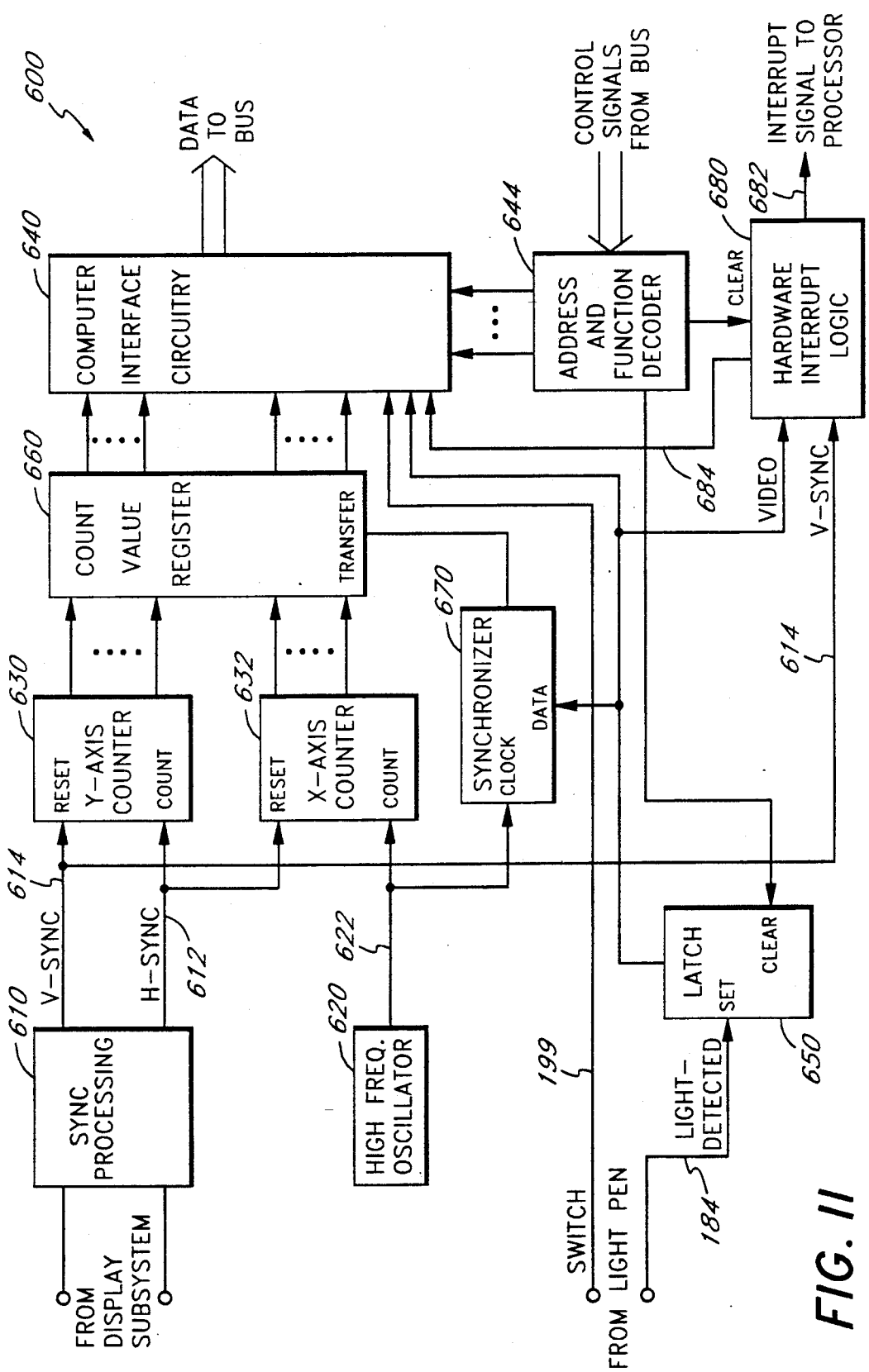
FIG. 11 is a simplified schematic block diagram view of the light pen interface apparatus incorporating the present invention.

FIG. 11 is a schematic block diagram of a light pen interface unit 600 implemented as the light pen interface subsystem 110 in accordance with the present invention. The light pen interface unit 600 differs from the prior art light pen interface unit 300 primarily in that the counters continue to run after a signal has been received from the light pen 120. Instead, the counter values are latched in holding registers "on-the-fly" when a light detection signal is received from the light pen 120. Furthermore, dual-source interrupt circuitry has been added to the apparatus of the present invention.

The vertical and horizontal sync pulses from the computer system 100 are transmitted to the sync processing circuitry 610. In FIG. 11, the sync processing circuitry 610 is essentially identical in function with the prior art sync processing circuitry 320 illustrated in FIG. 7 and provides respective processed horizontal and vertical sync signals on lines 612 and 614. Such signal processing may include filtering for noise removal, buffering, polarity inversion, and trailing-edge detection, but details of the signal processing are not pertinent to the present invention.

The high frequency oscillator 620 is also functionally identical to prior art oscillator 330, and serves to provide a constant high frequency signal on a line 622 that is counted to determine horizontal position of the light pen 120. As in the prior art, the high frequency oscillator 620 typically operates at a fixed frequency between 14 MHz and 50 MHz. The frequency at which the high frequency oscillator 620 operates may be expected to increase with the development of more advanced electronic components.

The gating circuitry 316 in the prior art light pen interface unit 300 is not utilized in the light pen interface unit 600 a y-axis counter 630 and an x-axis counter 632 are continuously operational, and are not halted by a latch signal as in the prior art light pen interface unit 300. Thus, counter operation is not suspended upon receipt of a signal from the light pen 120.

The x-axis counter 632 is similar to the prior art x-axis counter 312 in that the x-axis counter 632 receives the high frequency clock signal from the oscillator 620 via the line 622. The count registered in the x-axis counter 632 is incremented by one at each pulse of the signal output by the oscillator 620. Also, as in the prior art, the x-axis counter 632 is reset to 0 by the processed horizontal sync signal. As in the prior art apparatus, 10-bit to 12-bit counters are typically used to implement the x-axis counter 632.

The y-axis counter 630 is similar to the prior art y-axis counter 310 in that the y-axis counter 630 receives the processed horizontal synchronizing signal via the line 612 to increment its count state once for each horizontal sync pulse, and the y-axis counter 630 is reset to 0 by the processed vertical sync signal on the line 614. As in the prior art y-axis counter 310, 10-bit to 12-bit counters are typically used to implement the y-axis counter 630.

In the prior art light pen interface unit 300, significant time existed between the time that the signal from the light pen 120 was received (thereby stopping the counting process), and the time that the data from the counters 310, 312 had to be stable. The apparatus of the present invention, light pen interface unit 600, differs significantly in this area because the counters 630, 632 must not be stopped when retrieving data. Stopping the counters 630, 632, or otherwise introducing any perturbations in the counting process, will prevent accurate measurement of the position of the light pen 120. The count values registered on both the x- and y-axis counters 632, 630 must be latched while the counters 630, 632 continue to run (i.e., "on-the-fly").

The necessity of latching high speed counters as they continue to operate dictates the use of synchronous counter components within x-axis counter 632 and y-axis counter 630. Synchronous counters characteristically have extremely short stabilization times between count input signals and the output signal at the most significant stage. This short stabilization time is accomplished through the use of "look-ahead" logic for the "carry" terms generated by all stages. As implemented within the light pen interface unit 600, the high frequency oscillator 620 produces a symmetrical waveform with a 50% duty cycle, and the outputs of the synchronous counters 630, 632 are stable within $\frac{1}{4}$ of the period of the frequency of the oscillator 620. The input of x-axis counter 632 is edge triggered at the rising edge of the clock input from the oscillator 620, with a count state transition triggered at the rising edge of the clock signal from the oscillator 620. Thus, the outputs of the counters 630, 632 are stable before the falling edge of the clock signal from the oscillator 620.

The computer interface circuitry 640, the address and function decoder 644, and the latch 650 can all be implemented with substantially identical circuitry as the prior art computer interface circuitry 374, the address and function decoder 370, and the latch 350 respectively.

The new circuitry in the light pen interface unit 600 includes a count value register 660, a synchronizer 670, and a hardware interrupt logic circuit 680. A discussion of each new circuit component follows.

The count value register 660 is used to hold the values registered on the x-axis and y-axis counters 632, 630 at the point at which the light pen 120 transmits a light detection signal (after a slight synchronization delay, as explained below). The count value register 660 is typically implemented with type-D registers where all "D" transfer lines are driven in parallel. After the data is latched from the counters 630, 632 into the count value register 660, the data from the count value register 660 is then transmitted to the computer interface circuitry 640.

The purpose of the synchronizer 670 is to slightly delay the signal from the latch 650 to the "transfer" input of the count value register 660 such that the signal from the latch 650 will be applied to the "transfer" input of the count value register 660 in synchronization with the falling edge of the clock signal output of the oscillator 620 on the line 622. In summary, the synchronizer 670 assures that x-axis counting occurs on the rising edge of the high frequency clock output from the oscillator 620, and the latching of the count value from the x-axis counter 632 (if performed) occurs on the falling edge of the high frequency clock output from the oscillator 620 (i.e., after the outputs of the x-axis counter stages have stabilized). The synchronizer 670 may be implemented using a pair of Type-D registers using techniques commonly known to those skilled in the art.

No special circuitry is required for synchronization of the y-axis counter 630 because y-axis counting only occurs at a time when the light pen 120 could not produce a valid "detected-light" signal.

The hardware interrupt logic 680 is used to activate the hardware interrupt circuitry within the computer system 100 via a interrupt signal line 682, resulting in a suspension of whatever task was in process within the computer system 100, and a transfer of program control to a sub-program whose purpose is to process the interrupt. In the present invention, hardware interrupts are generated at each illuminated scan line within the field of view of the light pen 120, and each time the vertical synchronizing signal is sent to the display sub-system. Simultaneous generation and processing of both types of interrupts (i.e., at each scan line when the light pen 120 is detecting light, and at each vertical synchronizing pulse) is a key characteristic of the invention.

The hardware interrupt logic 680 performs the additional function of setting an internal latch (not shown) when triggering a hardware interrupt in response to a vertical synchronizing pulse. The output of this internal latch is fed to the computer interface circuitry 640 via a line 684 in order to inform a hardware interrupt control sub-program 500 (discussed in conjunction with FIG. 12A) that the interrupt signal was caused by a vertical synchronizing pulse.

The light pen interface unit 600 operates in a manner similar to the operation of the prior art light pen interface unit 300. The processed horizontal and vertical synchronization pulses are output from the sync processing circuitry 610. The horizontal sync pulse is used to increment the y-axis counter 630, thereby accounting for the vertical position of the electron beam 155, while the vertical sync pulse clears the y-axis counter each time the raster scan returns to the top of the computer monitor screen. Because the horizontal and vertical sync pulses are directly fed into the y-axis counter 630, and not gated, the value registered within the y-axis counter 630 is incremented and reset continuously.

The output of the high frequency oscillator 620 is used to clock the x-axis counter 632 so as to account for the horizontal position of the electron beam 155. The horizontal sync pulse clears the x-axis counter 632 each time the raster scan returns the electron beam 155 to the left side of the computer monitor screen. As mentioned above, the output of the oscillator 620 and the horizontal sync pulse are fed directly into the x-axis counter 632 so that the value registered within the x-axis counter 632 is incremented and reset continuously.

The output of the high frequency oscillator 620 is also provided to the synchronizer 670, as is the output of the latch 650. When a light detection signal is received from the light pen 120, the latch 650 is set a low output (although it will be apparent to one skilled in the art that a high output could be employed with minor modifications to the circuitry of the synchronizer 670). As in the prior art light pen interface unit 300, the latch 650 is initially clear and changes to a "set" state upon receipt of the light detection signal from the light pen 120. Because the counters 630, 632 run continuously there is no need for resynchronizing the counters 630, 632 with the vertical synchronizing pulse as there was in the prior art light pen interface unit 300. The latch 650 is cleared directly by a command from the control sub-program 500 through the address and function decoder 644.

When the output of the latch 650 is set, the synchronizer 670 delays the output of the latch 650 until the falling edge of the next clock pulse from the oscillator 620 is detected at the input of the synchronizer 670. Once the falling edge of the clock pulse from the oscillator 620 is detected at the input of the synchronizer 670, the output of the latch 650 is transmitted to the "transfer" input to the count value register 660. The delayed output from the latch 650 signals the count value register to transfer the current latched counter values (i.e., the values obtained from the immediately preceding rising edge of the clock pulse from the oscillator 620) to the input of the computer interface circuitry 640. The computer interface circuitry 640 then passes the counter values to the control sub-program 500 for processing.

The address and function decoder 644 receives commands generated by the control sub-program 500 in the computer system 100, and decodes those commands in a manner very similar that performed by the prior art address and function decoder 370 (FIG. 7). Specifically, commands are decoded for the computer interface circuitry 640 which allow the values of the x-axis and y-axis counters 632, 630 to be passed to the control sub-program 500 within the computer system 100. Furthermore, the state of various signals within the light pen interface unit 600, including the state of the output of the latch 650; the state of the latch within the interrupt logic 680 to determine whether a vertical sync interrupt has occurred, and the state of the switch signal from the light pen 120 along the line 199, may be read by the control sub-program 500 through the computer interface circuitry 640. In addition to the nearly identical signals produced to clear the latch 650 and transfer data to the computer system 100 through computer interface circuitry 640, the address and function decoder 644 generates a "clear" signal for the hardware interrupt logic 680.

Figure 12A:
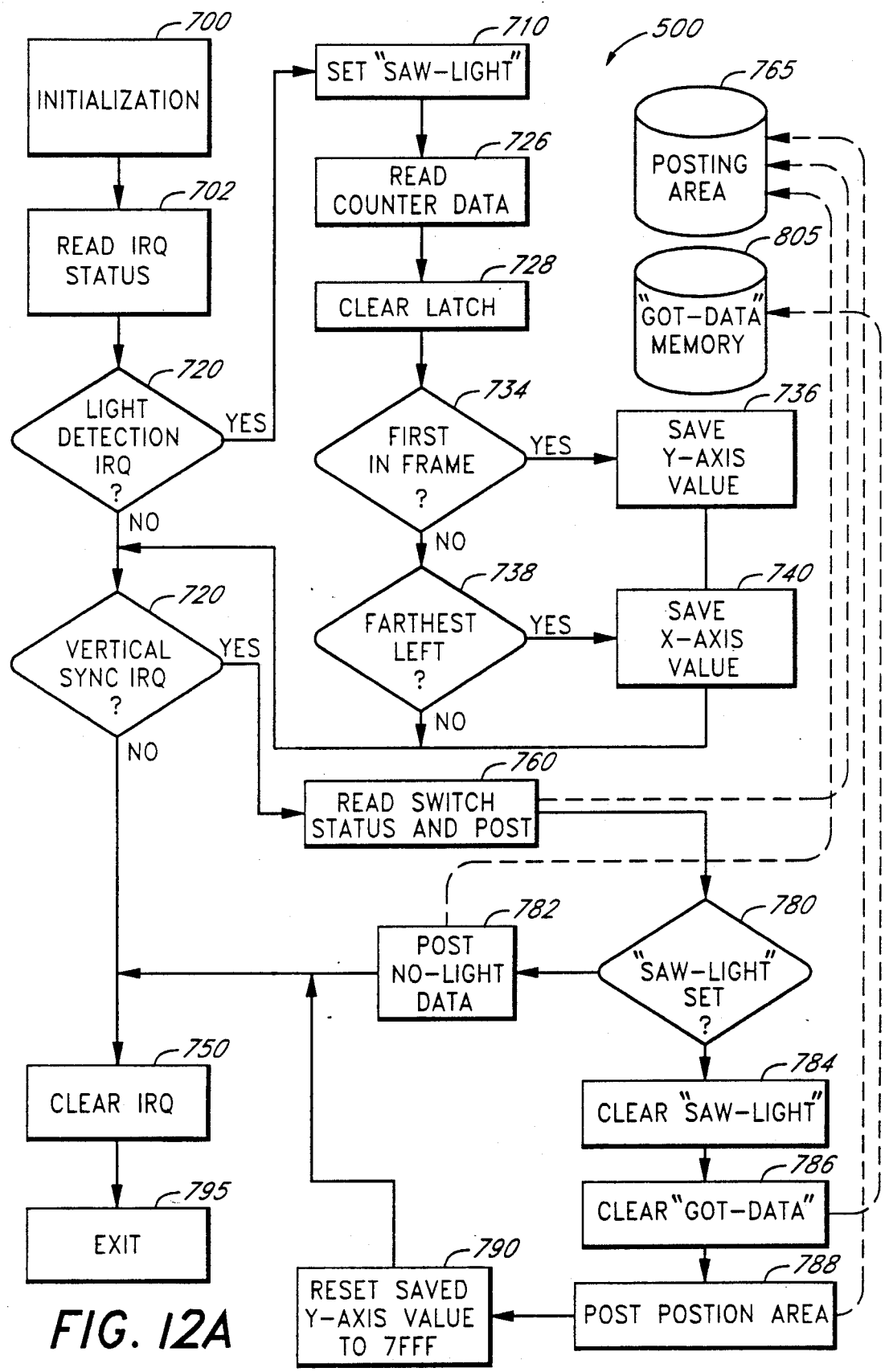
FIG. 12A is a block diagram of the software control sub-program that incorporates the hardware interrupts introduced in the present invention.

FIG. 12A illustrates a flowchart which details the method employed by the hardware interrupt control sub-program 500 in accordance with the present invention. The hardware interrupt control sub-program 500 interacts with the light pen interface unit 600. The purpose of the control sub-program 500 is to provide the required services for hardware interrupts generated by the light pen interface unit 600 in support of the control sub-program 480. The purpose of the control sub-program 480 is to provide a software interface for the calling program, so that the calling program can obtain information concerning the position and status of the light pen 120.

Upon entry into the control sub-program 500, in response to a hardware interrupt request, the method enters into a process block 700. Within the process block 700, hardware interrupt entry "housekeeping" functions that may be required preparatory to processing of data, such as saving of the values stored within the processor registers, are performed.

After the initialization functions are provided within the process block 700, the method enters into a process block 702. As set forth above, the control sub-program 500 is entered initially in response to some form of hardware interrupt. Within the process block 702 a read operation is performed to retrieve two bits of information from the light pen interface unit 600. The two bits obtained from the light pen interface unit 600 identify the source of the hardware interrupt. As set forth above, the hardware interrupt may be generated in response to one or both of two signals. Namely, the hardware interrupt may be generated when the latch 650 is set (i.e., in response to a light detection signal from the light pen 120), or the hardware interrupt may be generated by a vertical synchronizing pulse.

Once the two bits are read from the light pen interface unit 600 within the process block 702, a test is performed within the decision block 704 to determine the source of the interrupt. If the source of the interrupt was a detection of light within the field of view of the light pen 120 (i.e., the latch 650 is set), the method will branch to a process block 710. Otherwise, the method will continue into a decision block 720.

Assuming that the hardware interrupt is generated by a detection of light within the field of view of the light pen 120, the method enters into the process block 710. Within the process block 710, a software flag ("SAW-LIGHT") is set within the control sub-program 500 to indicate that light has been seen since the last vertical retrace interrupt. It should be noted that the software flag "SAW-LIGHT" is redundantly set at the detection of light for each visible horizontal scan line within the field of view of the light pen 120. The redundant setting of the flag "SAW-LIGHT" eliminates the calculation time that would be necessary if a test were performed to determine if the flag "SAW-LIGHT" had already been set.

After the flag "SAW-LIGHT" is set within the process block 710, read operations are performed on the light pen interface unit 600 in a process block 726 in order to obtain the position values stored within the x-axis and y-axis counters 630, 632. The position values read from the light pen interface unit 600 are held in a temporary storage memory area within the control sub-program 500 until the processing of the current hardware interrupt is competed.

After the x-y position values are read, the method then continues to a process block 728 wherein the latch 650 is cleared. The latch 650 is cleared so that a determination can be made if light is detected in the field of view of the light pen 120 in the next horizontal raster scan.

At the beginning of each frame (i.e., immediately following a vertical sync pulse), a single-frame "SAVE-Y" memory location which is used to save the value from the y-axis counter 630, is initialized to 7FFF (hex), indicating that the single-frame "SAVE-Y" memory location does not contain valid data. (This initialization is discussed in relation to the process block 790). The single-frame "SAVE-Y" memory location may be conventionally implemented as a register or any memory location within the computer system 100. Within a process block 734 a test is performed on the value stored within the single-frame "SAVE-Y" memory location to determine if the single-frame "SAVE-Y" memory location contains valid data (i.e., a value other than 7FFF (hex)). A 7FFF value in the single-frame "SAVE-Y" memory location would indicate that no other data has been retrieved since the last vertical retrace. Therefore a value of 7FFF stored within the single-frame "SAVE-Y" memory location indicates that the current hardware interrupt is the first hardware interrupt generated in response to the detection of light within the field of view of the light pen 120 since the last vertical sync pulse. Thus the current value obtained from the y-axis counter 630, and stored in the temporary memory location, is the vertical coordinate corresponding to the location of the first detected light signal. If the value stored within the single-frame "SAVE-Y" memory location is 7FFF, then the method proceeds to a process block 736. Any value other than 7FFF would indicate that the current interrupt was not generated by the first light detected in the current frame, the method would then enter a decision block 738.

If the method enters the process block 736, the y-axis counter value stored in the temporary memory location is transferred to the memory location where the y-axis value is saved. This y-axis counter value is saved until the next vertical sync pulse when the single-frame "SAVE-Y" memory location will be again initialized to 7FFF. The method then enters a process block 740 wherein the x-axis value stored within the temporary memory location is transferred to a single-frame "SAVE-X" memory location within the computer system 100 where the x-axis value is saved.

As stated above, the method will enter the decision block 738 if a hardware interrupt has been generated indicating that light has been detected in the current frame, and the generated hardware interrupt is not the first hardware interrupt generated because light has been detected in the field of view of the light pen 120. Within the decision block 738 a comparison is made between the most recently read x-axis counter value and the value in the single-frame "SAVE-X" memory location where the x-axis value is saved. Should the most recently read x-axis value be less than the value held in the single-frame "SAVE-X" memory location, the most recently read x-axis value corresponds to a position on the computer monitor screen which is to the left of the position on the screen corresponding to the x-axis value saved in the single-frame "SAVE-X" memory location. If the current detected position is to the left of the position corresponding to the x-axis value saved in the single-frame "SAVE-X" memory location, then the method enters into the process block 740. In the process block 740, the current x-axis value (i.e., the x-axis value stored in the temporary memory location) is transferred to the single-frame "SAVE-X" memory location and becomes the new left-most x-axis value. The method then exits the process block 740 and enters the decision block 720. If the current x-axis value is not less than the x-axis value stored within the single-frame "SAVE-X" memory location, the method enters directly into the decision block 720. The x-axis value stored within the temporary memory location will be replaced with a new x-axis value if the electron beam 155 subsequently re-enters the field of view of the light pen 120, generating a new hardware interrupt.

Note that the process block 740 is entered the first time light is detected within a frame, or if the position of the most recently detected light has a lower x-axis value than light previously detected in the current frame. In either case, the most recently read value for the x-axis counter will be transferred to the single-frame "SAVE-X" memory location.

A test is performed within the decision block 720 to determine if the light pen interface unit 600 has generated an interrupt in response to a vertical sync pulse. The method enters a process block 750 if the hardware interrupt was not generated in response to a vertical sync pulse. Otherwise, the method proceeds to a process block 760 if the interrupt was generated by a vertical synchronizing pulse. Note that if both conditions (i.e., a vertical sync pulse and a light detection signal) have simultaneously generated an interrupt, the structure of the control sub-program 500 is such that both interrupts will be properly serviced.

If the hardware interrupt has been generated by a vertical sync pulse then the method enters into the process block 760. Within the process block 760, the current status of the user actuated switch on the light pen 120 is read and stored in the frame-to-frame posting memory area 765 for future reference.

After the switch status bit has been stored in the frame-to-frame posting memory area 765, the method enters a decision block 780 wherein a test is performed to determine the status of the internal "SAW-LIGHT" flag that is set in the process block 710. If the status of "SAW-LIGHT" indicates that no light had been seen since the last vertical retrace, the method enters a process block 782 where data indicating that no light has been detected in the most recent frame would be stored in the frame-to-frame posting memory area 765 for future reference. The method would then exit the process block 782 and continue to the process block 750. If, however, the status of the flag "SAW-LIGHT" determined in the decision block 780 indicated that light had been detected in the most recently completed frame (i.e., the frame immediately preceding the vertical sync pulse that generated the interrupt being processed), the method enters the process block 784 wherein the "SAW-LIGHT" flag is cleared in preparation for the frame immediately following the vertical sync pulse that generated the interrupt being processed.

After the "SAW-LIGHT" flag is cleared within the process block 784, the method enters a process block 786 wherein an internal flag, "GOT-DATA" is cleared. The "GOT-DATA" flag indicates whether new light pen status information has been placed in the frame-to-frame posting memory area 765 since the last software subroutine call. The purpose of "GOT-DATA" is to eliminate reprocessing of position or switch status information of the light pen 120 that has not changed since previous processing of the switch and position information. The flag "GOT-DATA" is set during the software interrupt control sub-program 480 (discussed more fully below in accordance with FIG. 12B).

The method continues to a process block 788 after exiting the process block 786. In the process block 788, the left-most x-axis and the first-line y-axis counter values stored in the single-frame "SAVE-X" memory location, and the single-frame "SAVE-Y" memory location respectively, are transferred to the frame-to-frame posting memory area 765 for future reference.

After the x- and y-axis values have been transferred to the frame-to-frame posting memory area 765, the method enters a process block 790. In the process block 790, the single-frame "SAVE-Y" memory location where the y-axis value is saved, is reset to 7FFF (hex) in preparation for the new frame.

After the single-frame "SAVE-Y" memory location is reset, the method finally enters the process block 750. Within the process block 750, termination "housekeeping" associated with the control sub-program 500 (i.e., the sub-program entered in response to a hardware interrupt) is performed. Termination "housekeeping" includes functions such as clearing of hardware interrupt flags and restoration of processor registers. The method then returns control to the program being run at the time that the hardware interrupt was generated in a process block 795.

When the a software interrupt is generated within the current system application program (referred to hereinafter as the calling program), the control sub-program 480 is entered. The purpose of the control sub-program 480 is to obtain and process light pen position and status data. Rather than obtaining the light pen position and status data directly from the light pen interface unit 600, the control sub-program 480 retrieves updated data from preassigned memory locations. The preassigned memory locations include the frame-to-frame posting memory area 765, and a "GOT-DATA" memory location 805 (discussed in detail in accordance with FIG. 12B below). The significant advantage of obtaining light pen position and status data in this fashion is that the data is already updated and the necessity of wasting time in each subroutine call (i.e., approximately 1/50 second at each subroutine call in the prior art) to update the data is eliminated.

Figure 12B:
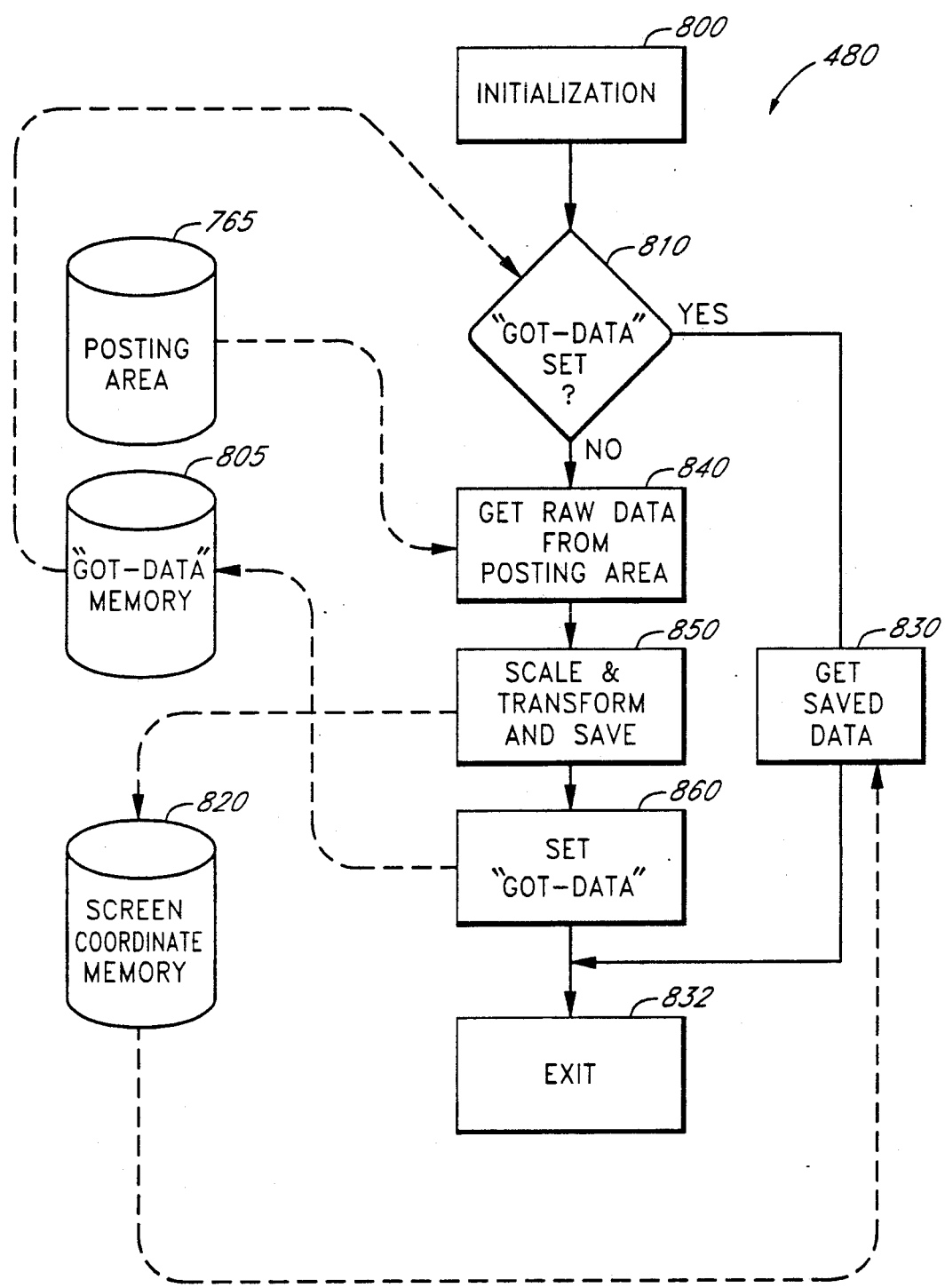
FIG. 12B is a block diagram of the software control sub-program that incorporates the software interrupts introduced in the present invention.

FIG. 12B illustrates a flowchart which details the method of the control sub-program 480 in accordance with the present invention. The control sub-program 480 is used to pass light pen position and status information back to the calling program. The method initially enters a process block 800 in response to a subroutine call or a software interrupt. Within the process block 800 sub-program entry "housekeeping" functions that may be required preparatory to further processing, such as saving of the values stored within processor registers, are performed.

After initialization within the process block 800, the method enters a decision block 810 wherein a test is performed to determine the state of the internal "GOT-DATA" flag (discussed previously in reference to the process block 786). If the "GOT-DATA" flag is set, this indicates that the switch status and position data of the light pen 120 has been processed and is stored within a screen coordinate memory area 820. If the "GOT-DATA" flag is not set, then this indicates that the switch status and position data of the light pen 120 has not been processed and is stored in its raw form in the frame-to-frame posting memory area 765.

If the "GOT-DATA" flag is set, then the method enters a process block 830, wherein the processed switch status and position data of the light pen 120 is retrieved from the screen coordinate memory area 820 for transfer to the calling program. The method would then continue to a process block 832 where the method would return control back to the calling program, and the control sub-program 480 would be exited.

If the "GOT-DATA" flag is not set then the method enters a process block 840. In the process block 840, the raw, or unprocessed, switch status and position data of the light pen 120 is retrieved from the frame-to-frame posting memory area 765.

After the data is retrieved from the frame-to-frame posting memory area 765, the method enters a process block 850. When the method arrives at the process block 850, it is known that the status or position of the light pen 120 has changed from the status or position of the light pen 120 last reported to the calling program. Generally, the calling program will expect the light pen data to be returned in a format in conformance with screen coordinates.

The raw counter values, which were originally obtained from the light pen interface unit 600, and retrieved from the frame-to-frame posting memory area 765 by the control sub-program 480, will usually not correspond to the user's computer monitor screen coordinates. At the very least, the y-axis value will contain an offset corresponding to horizontal synchronizing pulses that may have been sent to the display sub-system during vertical repositioning of the electron beam 155. In some cases, the computer may double and replicate scan lines in a manner that is unknown to the calling program. Similarly, a small amount of time is required by the display sub-system to be reposition the electron beam 155 once a horizontal synchronizing pulse is sent to the display sub-system by the computer system 100. Thus the x-axis counter 632 within the light pen interface unit 600 may have already accumulated counts before the electron beam 155 is completely repositioned to the left side of the computer monitor screen and starts another horizontal scan. The counts accumulated during the repositioning of the electron beam 155 result in an initial x-axis counter offset. Finally, the high frequency oscillator 620 and the pixel clock within the computer system 100 are asynchronous and are likely to differ in frequency. These conditions require that a scaling and translation algorithm be applied to the raw counter data retrieved from the frame-to-frame posting memory area 765. The scaling and translation algorithm contains data which is used to convert the raw counter data into values corresponding to screen coordinates which are expected by the calling program. Scaling and transformation of the light pen position data is the primary function of the process block 850.

Because the characteristics of a user's computer and display subsystem vary from other users, it is necessary to perform a calibration procedure upon installation of the control sub-program software so that the data used in the process block 850 will properly transform and scale the light pen position data. Upon installation of the control sub-program software, the user is first instructed to place the light pen 120 over an illuminated pixel on the upper left corner of his computer monitor screen. The user is then instructed to place the light pen 120 at the lower right corner of his computer monitor screen. The coordinates of the upper left corner of the computer monitor screen and the lower right corner of the computer monitor screen are used to determine the proper scaling and transformation values to be employed within the process block 850. The techniques used in this calibration method would be obvious to someone skilled in the art and will not be described in detail.

The scaled and transformed light pen position and status data will generally be placed within processor registers for return to the calling program. The processed light pen position and status data will also be saved in the screen coordinate memory area 820 within the control sub-program 480. The method will the exit the process block 850.

Once the method processes and saves the light pen position and status data, the flag "GOT-DATA" must be set to indicate that new data has been stored within the screen coordinate memory area 820. The method therefore enters a process block 860 wherein the internal flag "GOT-DATA" is set, and stored within the memory location 805. The method then proceeds to the process block 832 wherein the terminal "housekeeping" required by the control sub-program 480 (i.e., a sub-program entered in response to a subroutine call or software interrupt), such as restoration of processor registers is performed. Control is then returned to the calling program in a conventional manner.

Portions of the control sub-programs 480, 500 that would cause the described sections of the control sub-programs 480, 500 to be loaded into memory and initialized are not shown, but the techniques would be obvious to someone skilled in the art.

In this manner data from the light pen interface unit 600 is updated at each vertical sync pulse so that the time spent waiting for a light pen status update in the prior art is eliminated. This is an essential novel feature of the present invention, namely, by providing an asynchronous hardware interrupt, and by continually updating data at each hardware interrupt, significant computational overhead can be eliminated.

A further unique characteristic of the present invention is combination of a hardware interrupt system with a software interrupt of a subroutine call. While the prior art required actual determination of light pen status at each sub-program call, the invention allows that information to be determined at vertical retrace time, then passed very quickly to the calling program upon demand (i.e., through the memory areas 765, 805), further reducing the computational overhead associated with control sub-program.

What is claimed is:

1. A method for reducing the positional jitter that occurs when using a light pen to detect an illuminated pixel on a video display screen of a raster scanning video display monitor in a computer system, comprising the steps of:

resetting a first count value on the occurrence of an active vertical synchronization signal from the computer system;

incrementing said first count value on each occurrence of an active horizontal synchronization signal subsequent to the vertical synchronization signal;

resetting a second count value on each occurrence of the horizontal synchronization signal;

incrementing said second count value on each cycle of a high frequency oscillator output signal;

detecting the illumination of a pixel on the video display screen within the field of view of the light pen and providing a light-detected output signal responsive thereto;

storing a first count value and a second count value on the occurrence of said light-detected output signal and generating an interrupt signal to the computer system;

generating a first interrupt signal to the computer system when said light-detected signal is activated;

responding to said first interrupt signal to transfer said first and second count values to the computer system to identify the location of the illuminated pixel and saving said transferred values;

deactivating said light-detected output signal;

repeating said steps of incrementing said first count value, resetting said second count value, incrementing said second count value, detecting the illumination of a pixel, storing said first and second count values, transferring and storing said first and second count values, and resetting said light-detected output signal;

selecting one of said first count values and one of said second count values to represent the location of the light pen on the video display screen, said selected one of said second count values being the smallest of said stored second count values; and generating a second interrupt signal to the computer system on each occurrence of the vertical synchronization signal, the computer system responding to said second interrupt signal to select said selected one of said first count value and said selected one of said second count value.

2. The method as defined in claim 1, further including the step of determining whether the light pen is positioned on the video display screen, said step comprising the steps of:

detecting a first occurrence of said second interrupt signal;

waiting for a second occurrence of said second interrupt signal; and setting a flag to indicate that the light pen is positioned on the video display screen if said first interrupt signal occurs between said first and second occurrences of said second interrupt signal.

* * * * *